United States Patent [19]

Kincaid

[11] Patent Number: 5,623,669

[45] Date of Patent: Apr. 22, 1997

[54] HIGH SPEED ONLINE COPY OF PARTITIONED DATA

[75] Inventor: W. James Kincaid, San Jose, Calif.

[73] Assignee: International Business Machines Corporation, Armonk, N.Y.

[21] Appl. No.: 689,630

[22] Filed: Aug. 13, 1996

Related U.S. Application Data

[63] Continuation of Ser. No. 402,754, Mar. 10, 1995, abandoned, which is a continuation of Ser. No. 95,632, Jul. 21, 1993, abandoned.

[51] Int. Cl.$^6$ .................................................... G06F 5/00
[52] U.S. Cl. ........................... 395/621; 395/250; 360/48
[58] Field of Search ................................. 395/700, 250, 395/425, 800

[56] References Cited

U.S. PATENT DOCUMENTS

| | | | |
|---|---|---|---|
| 4,507,751 | 3/1985 | Gawlick et al. | 364/900 |
| 4,716,528 | 12/1987 | Crus et al. | 364/300 |
| 4,855,907 | 8/1989 | Ferro, Jr. et al. | 364/300 |
| 4,959,771 | 9/1990 | Aridin, Jr. et al. | 364/200 |
| 5,134,696 | 7/1992 | Brown et al. | 395/425 |
| 5,146,561 | 9/1992 | Carey et al. | 395/200 |
| 5,175,849 | 12/1992 | Schneider | 395/600 |
| 5,193,184 | 3/1993 | Belsan et al. | 395/600 |
| 5,239,644 | 8/1993 | Seki et al. | 395/425 |
| 5,276,808 | 1/1994 | Cheney et al. | 395/250 |
| 5,313,602 | 5/1994 | Nakamura | 394/425 |
| 5,315,708 | 5/1994 | Eidler | 395/250 |
| 5,319,752 | 6/1994 | Peterson et al. | 395/250 |
| 5,375,232 | 12/1994 | Legvald et al. | 395/575 |
| 5,398,142 | 3/1995 | Davy | 360/48 |
| 5,410,727 | 4/1995 | Jaffe et al. | 395/800 |

OTHER PUBLICATIONS

Mikkelsen, US S/N 07/781,044, filed Oct. 18, 1991, "Method and Means for Time Zero Backup Copying of Data", (SA991017).

Wang et al., US S/N 07/385,647, filed Jul. 25, 1989, "Computer–Based Method for Data Set Copying Using an Incremental Backup Policy", (SA980943).

*Primary Examiner*—Kevin A. Kriess
*Assistant Examiner*—Majid A. Banankhah
*Attorney, Agent, or Firm*—Ingird M. Foerster

[57] ABSTRACT

Disclosed is a CPU-implemented method for logically copying partitioned datasets from a source device to a target device in a storage subsystem. The method improves performance over prior logical copy utilities by substantially decreasing the number of I/O's required for the operation. A source dataset is designated on a first storage device and members are selected for copying. A target dataset is designated on a second storage device. The target dataset may be newly created or may already exist. If the latter, existing members remain alterable by other system users during copying. All selected source members, or a subset thereof, are opened for input. An equal number of target members are created in the target dataset in a single directory write operation. All data records of the selected source members are input to the CPU's virtual storage, and then transferred to the target members via frugal use of data I/O's. When the selected data records have been transferred, all target members are named using a single directory write operation. Finally, the source and target members are closed. During copying, other system users may browse the selected source members, but the unnamed target members will be invisible to them until copying is complete.

12 Claims, 25 Drawing Sheets

HIGH SPEED ONLINE COPY OF PARTITIONED DATA

This application is a continuation of application Ser. No. 08/402,754, filed on Mar. 10, 1995 now abandoned which is a continuation of application Ser. No. 08/095,632, filed on Jul. 21, 1993 now abandoned, entitled "HIGH SPEED ONLINE COPY OF PARTITIONED DATA", in the name of W. James Kincaid.

FIELD OF THE INVENTION

The present invention relates generally to a method for copying partitioned datasets between devices in system managed storage. In particular, a dataset is copied by performing a series of logical copies, each logical copy comprising the copying of several dataset members.

BACKGROUND OF THE INVENTION

Computer systems are capable of storing large amounts of data in main memory, which typically comprises direct access storage devices (DASDs). Data is physically stored in designated data fields within the storage device. For example, information stored in a DASD is located on magnetic disks having concentric tracks, such tracks being further divided into data fields. Each disk has at least one dedicated head per face for writing data to and reading data from the disk. Data fields are identified by storage device number, head, track number and physical address. Data storage and retrieval is controlled by the operating system program residing in the central processing unit (CPU).

System users access information in main memory through a user interface, which is part of the operating system program. The user interface categorizes data by named datasets or files. To retrieve a particular item of data, the system user specifies the dataset or file containing the desired data. The operating system then "looks up" the dataset name in a table of contents for main memory. The table contains a list of dataset names and the physical location of stored data in main memory associated with those dataset names. The data is retrieved from main memory and placed in virtual memory space. Conceptually, virtual memory is a workspace in the CPU's volatile storage, portions of which may be temporarily assigned to system users as they run applications.

As data is transferred to virtual memory, the physical addresses are mapped into logical memory addresses. The logical addresses are used by applications programs to access and retrieve the data from virtual storage. Once the user applications are completed, the updated data is transferred back to main memory, and the logical addresses will be mapped back into actual physical addresses.

Retrieval of data from non-volatile storage devices such as DASDs consumes considerable time, since the CPU must initiate a request for data and wait for the device to locate and retrieve the information. In contrast, volatile memory such as RAM can be accessed quickly. Such volatile memory in the CPU is used to provide virtual memory to system users. Thus, applications running from virtual memory are more efficient than those accessing main memory directly. In addition, data in virtual memory is easily manipulated.

Operating systems implementing system managed storage require means for copying data from one main memory storage device to another. Typically, either a physical copying or logical copying utility is employed.

Physical Copying. A physical copy utility acquires the physical address of source data on a source storage device, and the physical address of the desired target location on a target device. The source and target storage devices may, for example, be direct access storage devices (DASDs). The utility reads tracks from the source DASD into virtual storage and then writes them at the desired location on the target DASD.

A physical copy utility offers the advantage of speed since it essentially runs at the device speed. But this method has a number of limitations. One such limitation is the necessity that the source and target datasets must be locked for the duration of the copy. In other words, members of the dataset being copied will not be accessible to other users until copying is complete. Another limitation of this approach is the need for an empty target dataset, usually on the same device type as the source (e.g. two IBM 3390 DASDs). Space must therefore be available on the target DASD before copying can occur. Moreover, the method is not suitable for copying between different device types (e.g. from an IBM 3380 to an IBM 3390). Yet another limitation of physical copying is the requirement that data is written to the target location precisely as it is read, so that no compression (ie. removal of unnecessary spaces or "gas" between relevant data) will occur. For these reasons, physical copying is used for relatively limited purposes such as dump/restore operations.

Logical copies. A logical copy utility uses the same interfaces as an application program to read data from a source and to write that data to a target location. One example of an implemented logical copy utility is the IEBCOPY with PDSE (Partitioned Data-Set Extended) to PDSE copy capability, released in the International Business Machines Data Facility Program version 3.2.0. IEBCOPY runs in a multiple virtual storage (MVS) operating system environment.

The IEBCOPY utility performs the following steps for each copy operation:

1) Open a source dataset
2) Create a target dataset
3) Read the records of the source dataset into virtual storage
4) Write the records from virtual storage to the target dataset
5) Name the target dataset
6) Close the source dataset
7) Close the target dataset The MVS operating system organizes data into datasets of different types. Two specific examples of dataset types are the sequential and partitioned datasets. As previously discussed, a sequential dataset is associated with certain data which is accessed by referencing the dataset name. A partitioned dataset is similarly associated with certain data, but this data is further organized into members, each having a unique member name. Thus data must be accessed by referencing both the dataset name and the member name.

Copying of sequential datasets via a logical copy utility is relatively straightforward. The source dataset is opened and all data associated with that dataset is read at once, and written to a target dataset in the same manner. Copying of partitioned datasets is more complicated. Namely, the sequence of steps outlined above for copying a dataset must be performed on each member of a partitioned dataset.

Therefore, the sequence of steps involved in copying a partitioned dataset using the IEBCOPY utility for PDSE to PDSE copies is as follows:

1) Open a source dataset and allocate space in the target device for a target dataset
2) For each member,
   a) Open a source member
   b) Create a target member
   c) Read the records of the source member into virtual storage
   d) Write the records from virtual storage to the target member
   e) Name the target member
   f) Close the source member
   g) Close the target member
3) Once all members have been copied, close the source dataset and the target dataset.

Logical copying of partitioned datasets is desirable because it provides the flexibility of an application program. For instance, users are not locked out of an entire dataset during a copy operation but may access any member of the source not currently being copied. In addition, data may be copied from a source device of one type to a target device of another type (e.g. IBM 3380 to IBM 3390). Another advantage of logical copying is the fact that "gas" existing in the source dataset will not be copied to the target. Moreover, members physically fragmented in the source dataset may be allocated to contiguous space in the target, provided that enough contiguous space exists. As a further advantage, the target dataset may be an existing dataset with existing members. These members remain accessible to users while new members are being copied in.

Logical copy utilities can be highly efficient for copying large sequential datasets. However, for partitioned data the method is inefficient and slow. Often, partitioned datasets have thousands of members, each member having only a small amount of associated data. In such a case, there is substantial processing overhead for a relatively small amount of total data being transferred. For example, the IEBCOPY facility requires two directory writes per member, and a minimum of two data I/Os to read all of the data from the input member on the source device and write it to the target. Thus for a data set with 1000 members, at least 4000 I/Os must be performed.

What is needed is a software copy facility that has the flexibility of logical copying, yet offers high speed performance in copying partitioned datasets.

SUMMARY OF THE INVENTION

It is therefore an object of the present invention to provide a software logical copy facility for copying partitioned datasets which offers an efficient compromise between the high performance and limited flexibility of physical copy facilities, and the low performance and high flexibility of logical copy facilities.

Another object of the present invention is to provide a logical copy facility to substantially increase the efficiency of logically copying partitioned datasets having a large number of relatively small members.

A further object of the present invention is to substantially reduce the total number of data and directory I/Os required to logically copy a partitioned dataset from a source device to a target device, compared to previous logical copy facilities.

Yet another object of the present invention is to economize, when virtual storage constraints exist, by subdividing the task of copying a large partitioned dataset into a series of logical copy operations. Each operation copies a subset of the total number of dataset members, and the size of the subset is determined by an economical virtual storage buffer size.

It is a further object of the present invention to provide a software copy facility suitable for logically copying a partitioned dataset from a source device of one type to a target device of a different type at substantially greater speeds than previous logical copies were able to achieve.

Another object of the present invention is to permit users, during a series of copy operations on one dataset, to alter those members not being copied and to browse those members currently being copied.

It is another object of the present invention to provide a software copy facility that permits copying from a source partitioned dataset to an existing target dataset, while preserving user access to existing members of the target dataset.

A further object of the present invention is to provide a logical copy facility adaptable to operating systems using hierarchical directory structures, such as OS/2 and AIX, as well as operating systems using partitioned dataset structures, such as MVS.

DESCRIPTION OF THE PREFERRED EMBODIMENT

Figure 1:
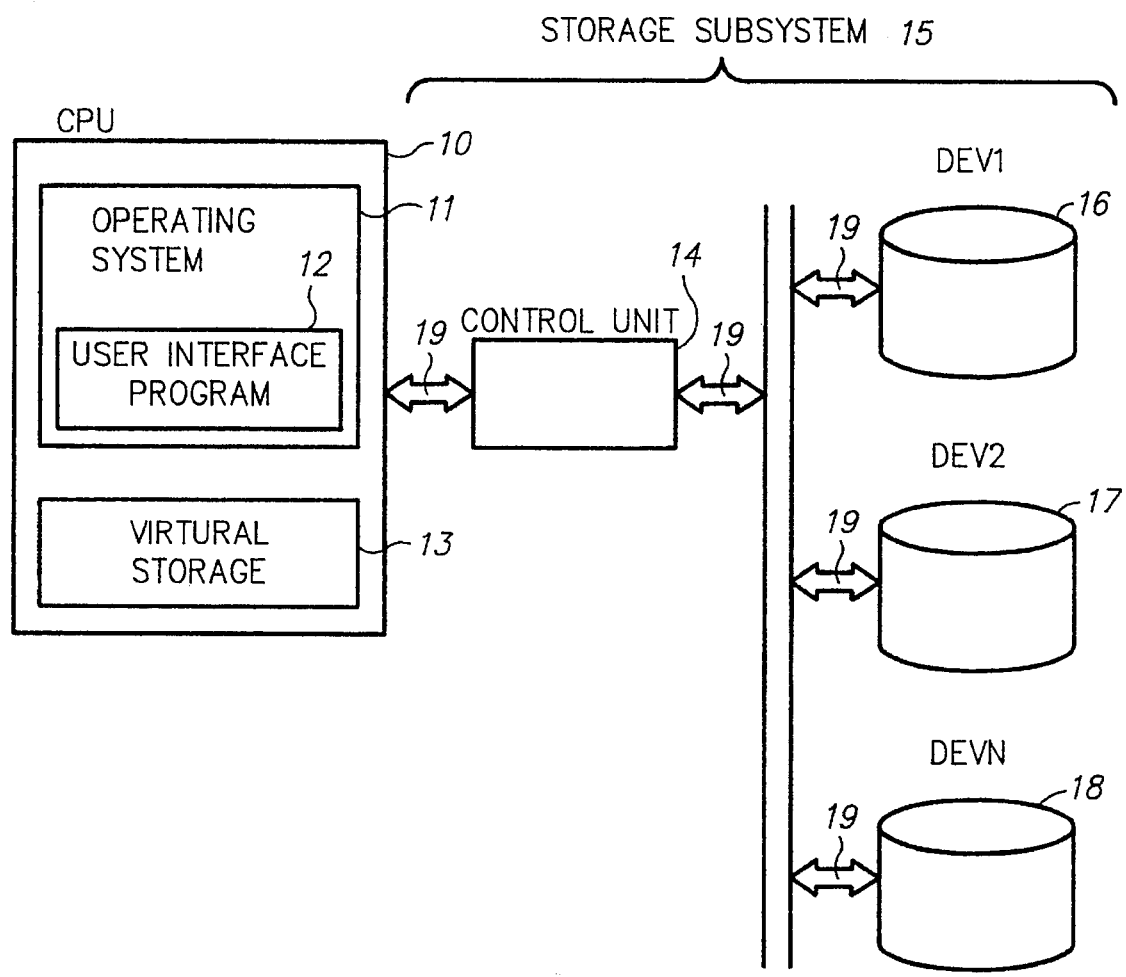
FIG. 1 is a system diagram of a central processing unit (CPU) linked to a data storage subsystem.

FIG. 1 depicts an MVS-based computer system. A central processing unit (CPU) 10 is linked via a common bus to storage subsystem 15. The storage subsystem 15 comprises a control unit 14 and a plurality of storage devices (DASDs) 16,17,18 linked together through a common bus 19. To illustrate different types of copy operations, DEV1 16 will be presumed to hold a source partitioned dataset (PDSE on MVS) for copying. It has accordingly been labeled "Source Device" in FIG. 1. DEV2 17 is labeled "Target Device", and will be presumed to hold the target dataset when copying is complete.

Figure 2:
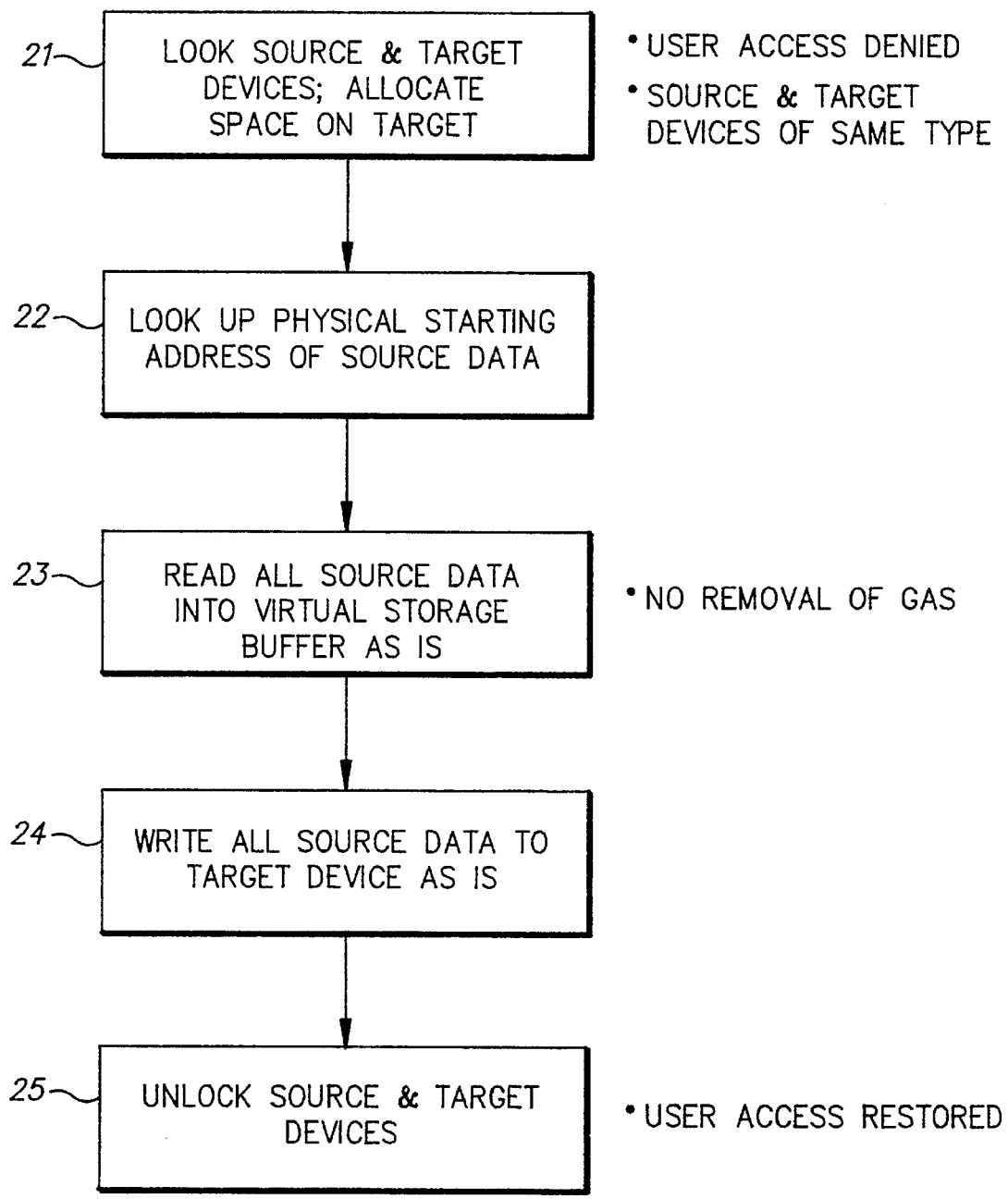
FIG. 2 is a general flow diagram of a known physical copy operation.
Figure 3:
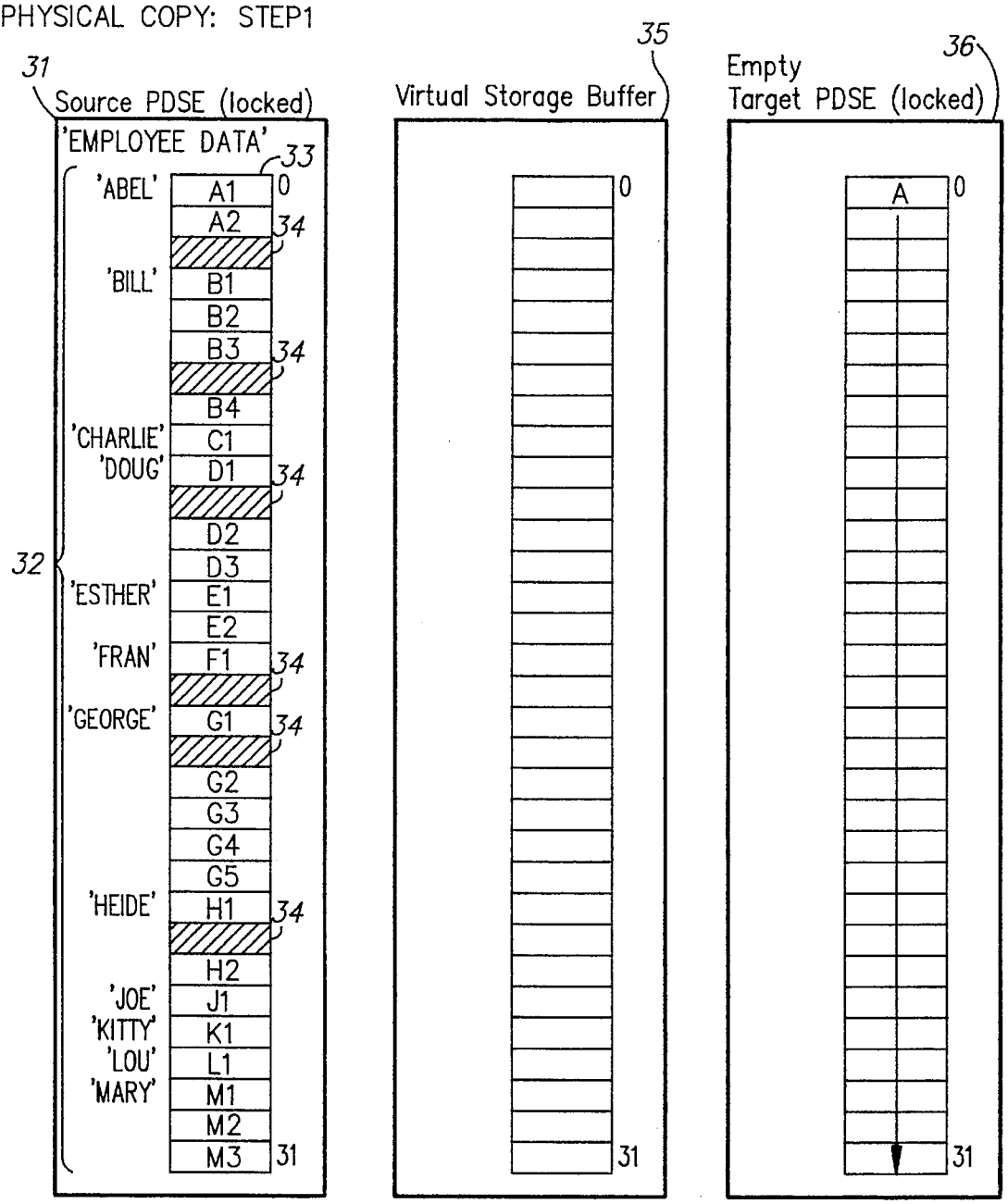
FIGS. 3, 4 and 5 illustrate the contents of a source dataset, target dataset and virtual storage during the physical copy operation shown in FIG. 1.
Figure 4:
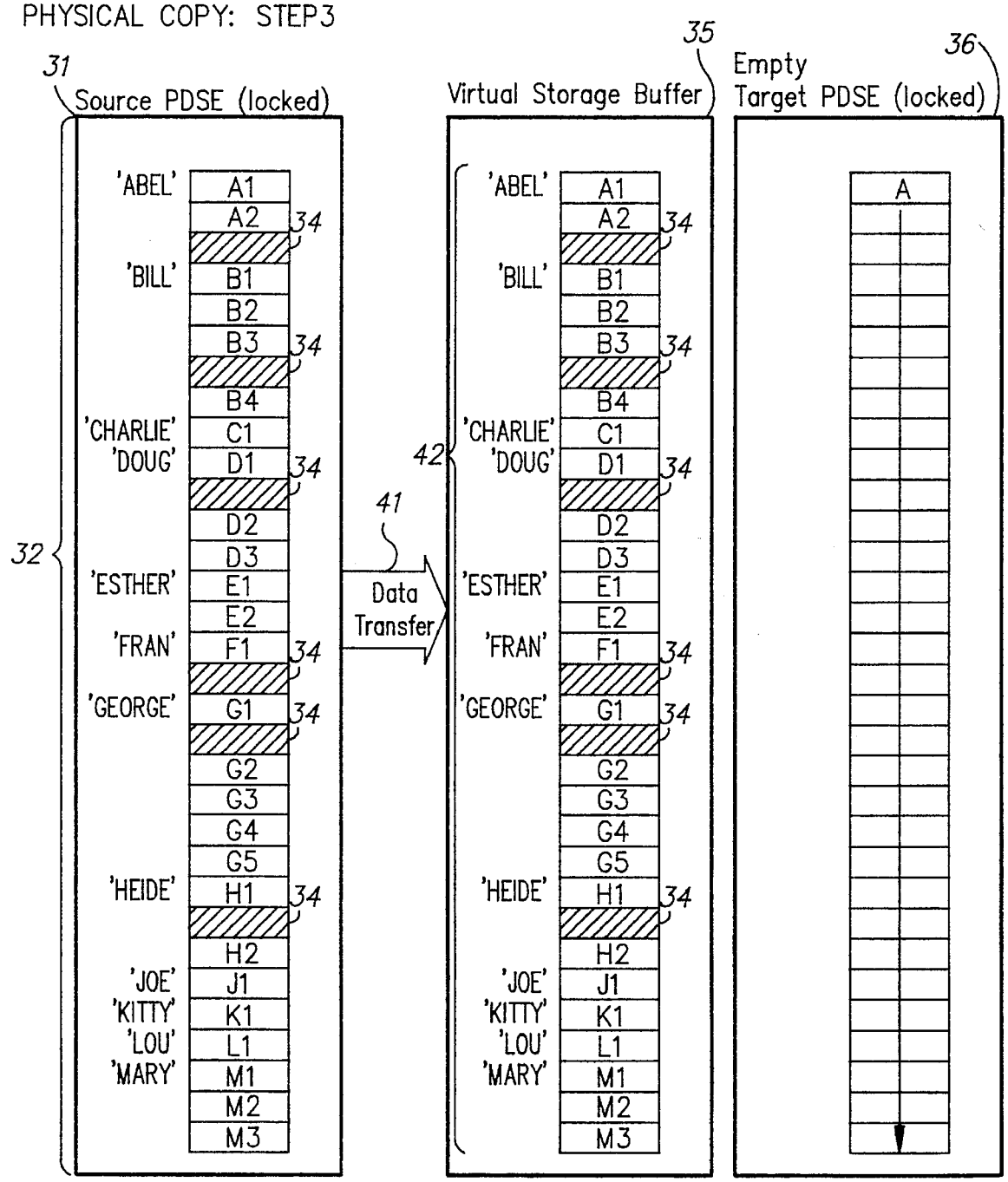
Figure 5:
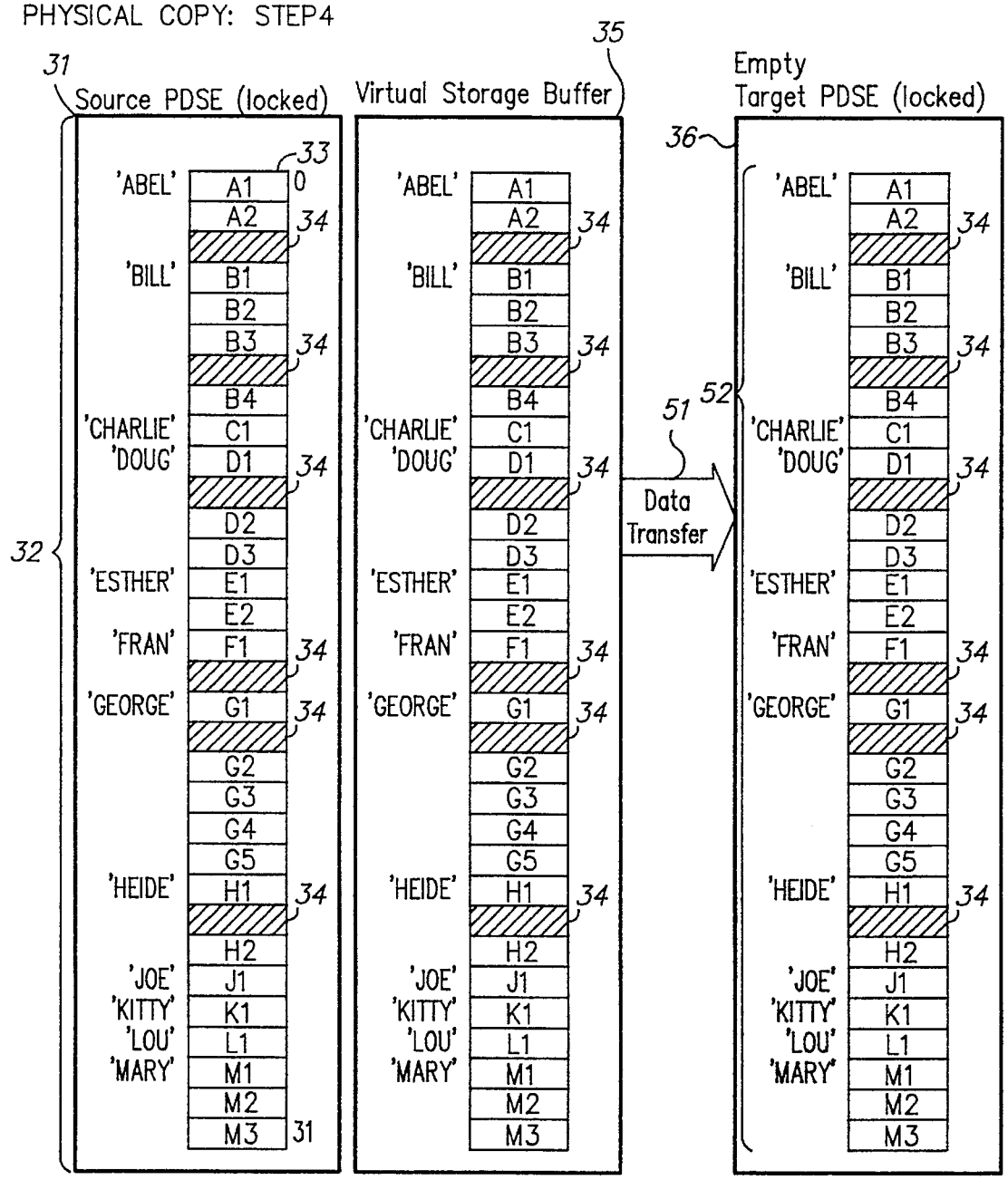

FIG. 2 is a general flow diagram of a physical copy operation. FIGS. 3, 4 and 5 further define the data transfer taking place when a dataset is physically copied from DEV1 16 to DEV2 17. Referring first to FIG. 3, a source PDSE is shown 31. The source PDSE is named "EMPLOYEE-.DATA" and contains twelve members 32. The first member of the dataset is labeled "Abel", the second "Bill", and so forth. The blocks shown beside each member name represent records of data 33 physically stored in the source DASD (MVS systems partition data into records of a predetermined length). For example, member "Abel" comprises two data records, labeled "A1" and "A2" for illustration purposes. Member "Bill" has four records, labeled "B1", "B2", "B3" and "B4", etc. The shaded blocks 34 represent empty spaces or "gas" between the member records. Also shown in FIG. 3 are a virtual storage buffer 35, and an empty target dataset 36. The buffer 35 resides in CPU virtual memory. For convenience, it is shown to have the same length as the source dataset. The empty target dataset 36 represents physical space in the target device 17 allocated for the dataset to be copied.

During Step 21, the source and target devices are first locked or taken offline to prevent user access, and space is allocated on the target device 11. The copy utility then looks up the physical starting address of the source dataset in Step 22, and initiates a read at that location on the source device. In Step 23, all of the source data is read into virtual storage. The transfer is represented in FIG. 4 by an arrow 41 labeled "Data Transfer" between the source PDSE 31 and the virtual storage buffer 35, and the appearance of named members and their corresponding data records 42 in buffer 35. The data is stored in the same format as the source data 32. Consequently, no data manipulation or removal of empty data fields 34 occurs. In Step 24, the data in virtual memory 35 is then written to the allocated space in the target device (DEV2) 17, also without any changes. FIG. 5 represents the data transfer with the arrow 51 from virtual memory buffer 35 to target dataset 36, and by the appearance of named members and their corresponding records 52 in the allocated target space. When writing is complete, the source and target devices are unlocked or placed online in Step 25, once again permitting user access to the data.

Since all source data is transferred at once without changing form, a physical copy operation can be essentially be performed at the device speed. But as mentioned above, this method has certain limitations. User access is interrupted while copying occurs. Moreover, unnecessary space will not be removed from the source data before it is written. Finally, the target device must be of the same type as the source device, and the target dataset must be empty.

Figure 6:
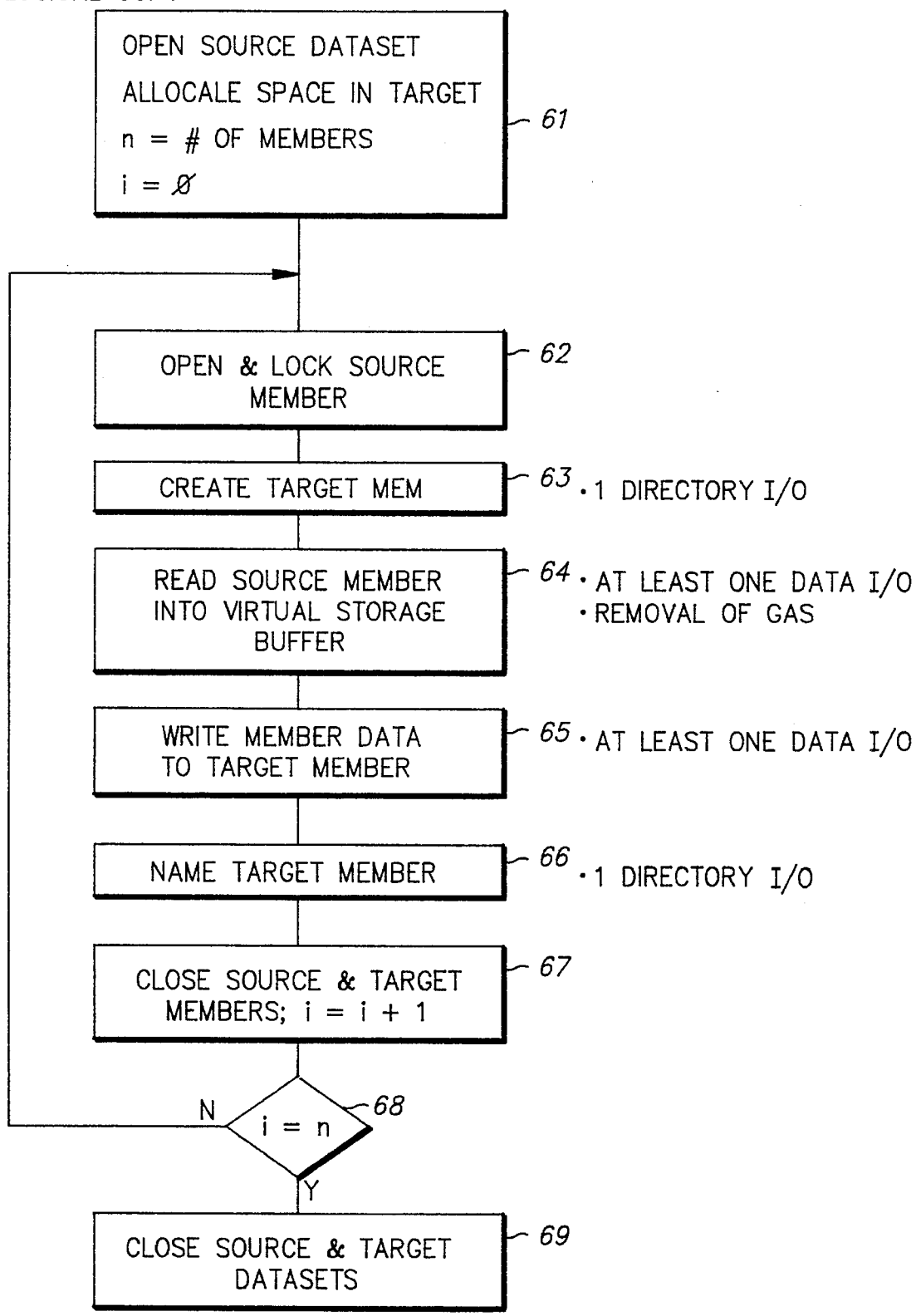
FIG. 6 is a general flow diagram of a known logical copy operation.
Figure 7:
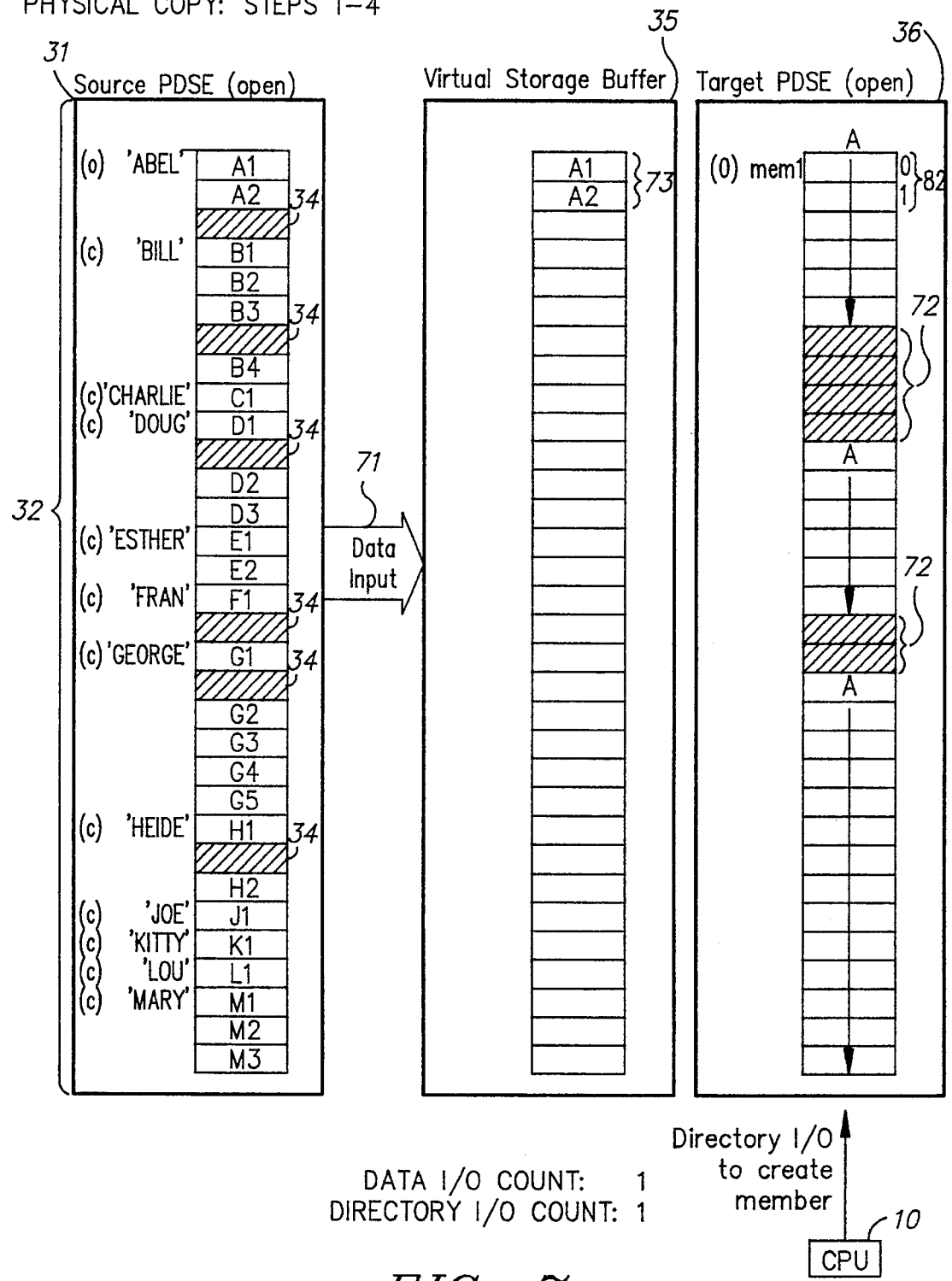
FIGS. 7, 8, 9, 10 and 11 illustrate the contents of a source dataset, target dataset and virtual storage during the logical copy operation shown in FIG. 6.

FIG. 6 shows the general order of events in a logical copy operation between source device 16 and target device 17 on an MVS system. FIGS. 7,8,9,10 and 11 further illustrate the data transfers between physical and virtual storage which occurs. In Step 61, the copy utility locates and opens the source dataset, then determines its record length. The required space is allocated on the target device 17. FIG. 7 shows the source partitioned dataset 31, a virtual storage buffer 35, and target dataset 36. Note that the target dataset is not empty. (Recall that logical copying utilities permit copying to either newly created or existing datasets). The shaded areas 72 represent physical areas of the track unavailable in the target device (e.g. these may represent existing members in the target dataset, or faulty blocks).

Referring back to FIG. 6, the logical copying of the dataset is achieved by repeating Steps 62-67 once for each member 32 to be copied. In Step 2, the source member is opened and locked. The CPU 10 initiates a directory write in Step 3 to create a new, unnamed target member in the target device 17. The source data is input to virtual storage in Step 4.

FIG. 7 illustrates Steps 61-64 for copying of member "Abel" For Step 61, flowlines labeled "A" indicate the space allocated in the target dataset 36. An "(o)" denotation beside "Abel" in the source PDSE 31 indicates that this member has been opened for input (Step 2). The unnamed member created in Step 63 is shown in the target PDSE 36 as "mem1" 74, and the "(o)" denotation beside it indicates that it has been opened for input. An arrow 71 labeled "Data Input" and records "A1" and "A2" 73 appearing in the buffer 35 represent the transfer of records from DEV1 16 to virtual storage 13 (Step 4). Note that only the records of member "Abel" are transferred at this point. At the completion of Steps 62-64, one data I/O and one directory I/O have taken place, as indicated in FIG. 7.

Figure 8:
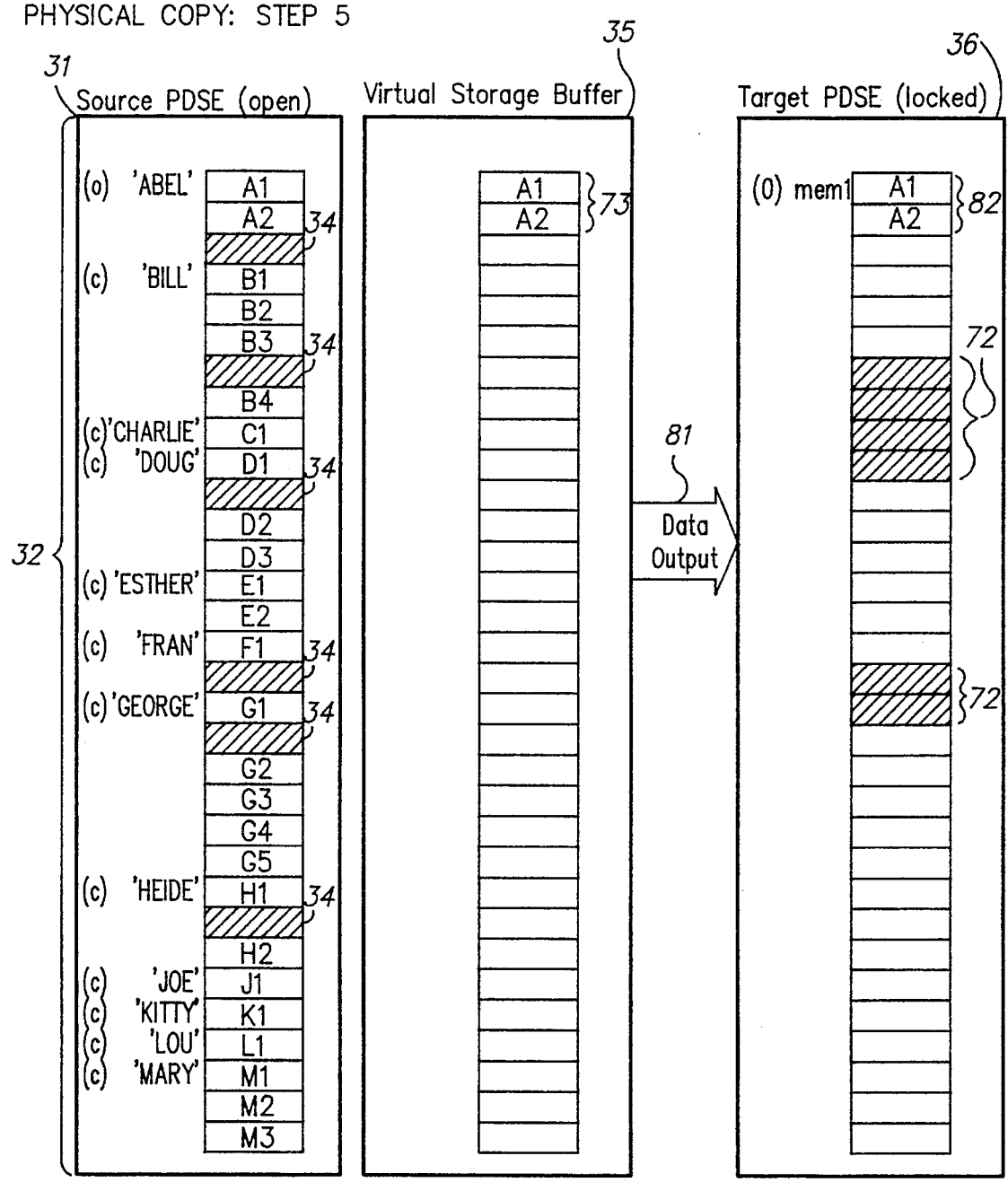

Next, the records of member "Abel" are written to the target dataset 36 (see FIG. 4, Step 65). In FIG. 8, this transfer is represented by an arrow 81 labeled "Data Output" between the storage buffer 35 and target PDSE 36, and by the appearance of records "A1" and "A2" 82 in the allocated target space. The data I/O count is now equal to two.

Figure 9:
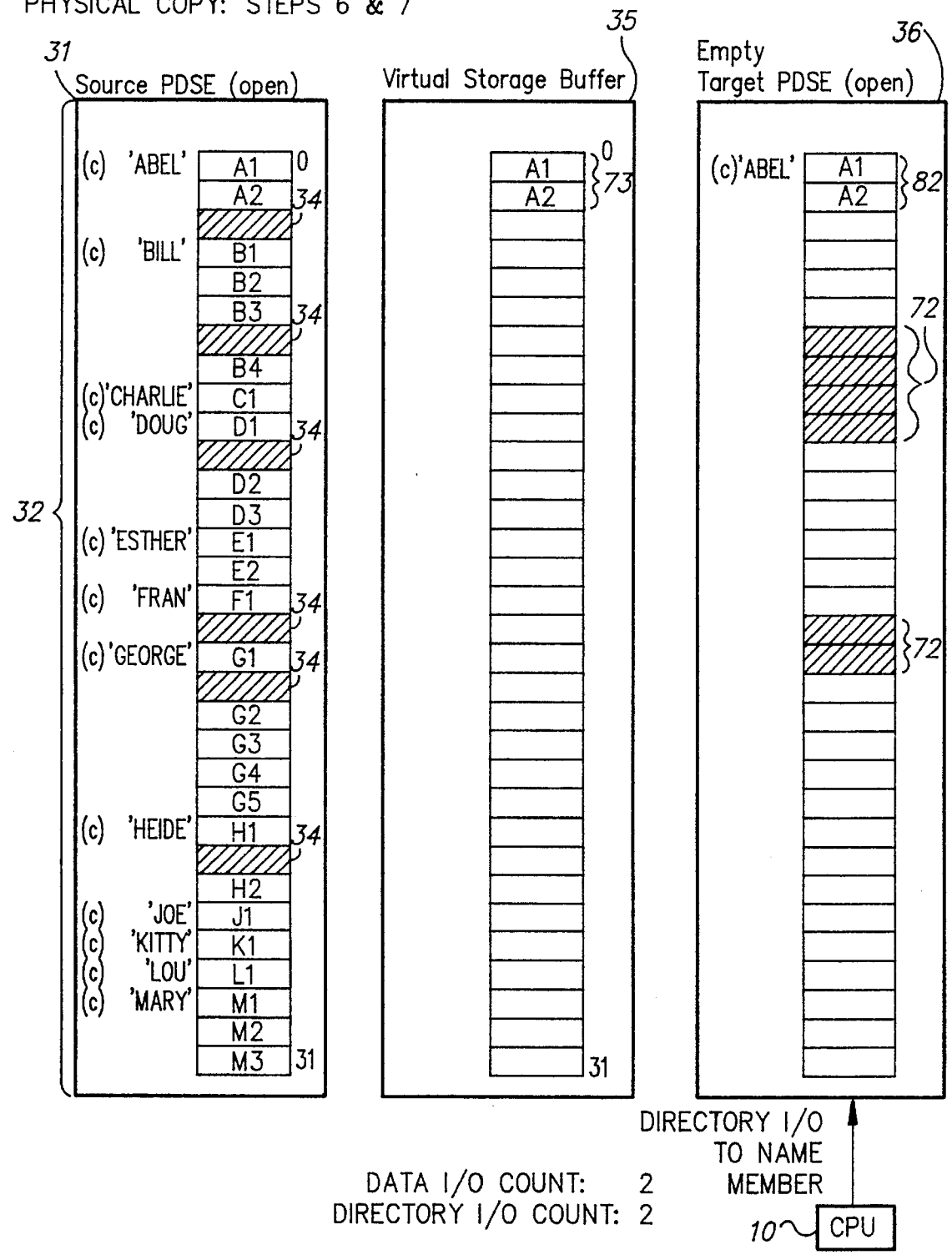

In Step 66 of FIG. 4, the CPU issues a directory write to name the target member 74, and in Step 67 the source and target members are closed. These steps are represented in FIG. 9. A "(c)" beside the source and target members "Abel" indicates that these members have been closed.

Figure 10:
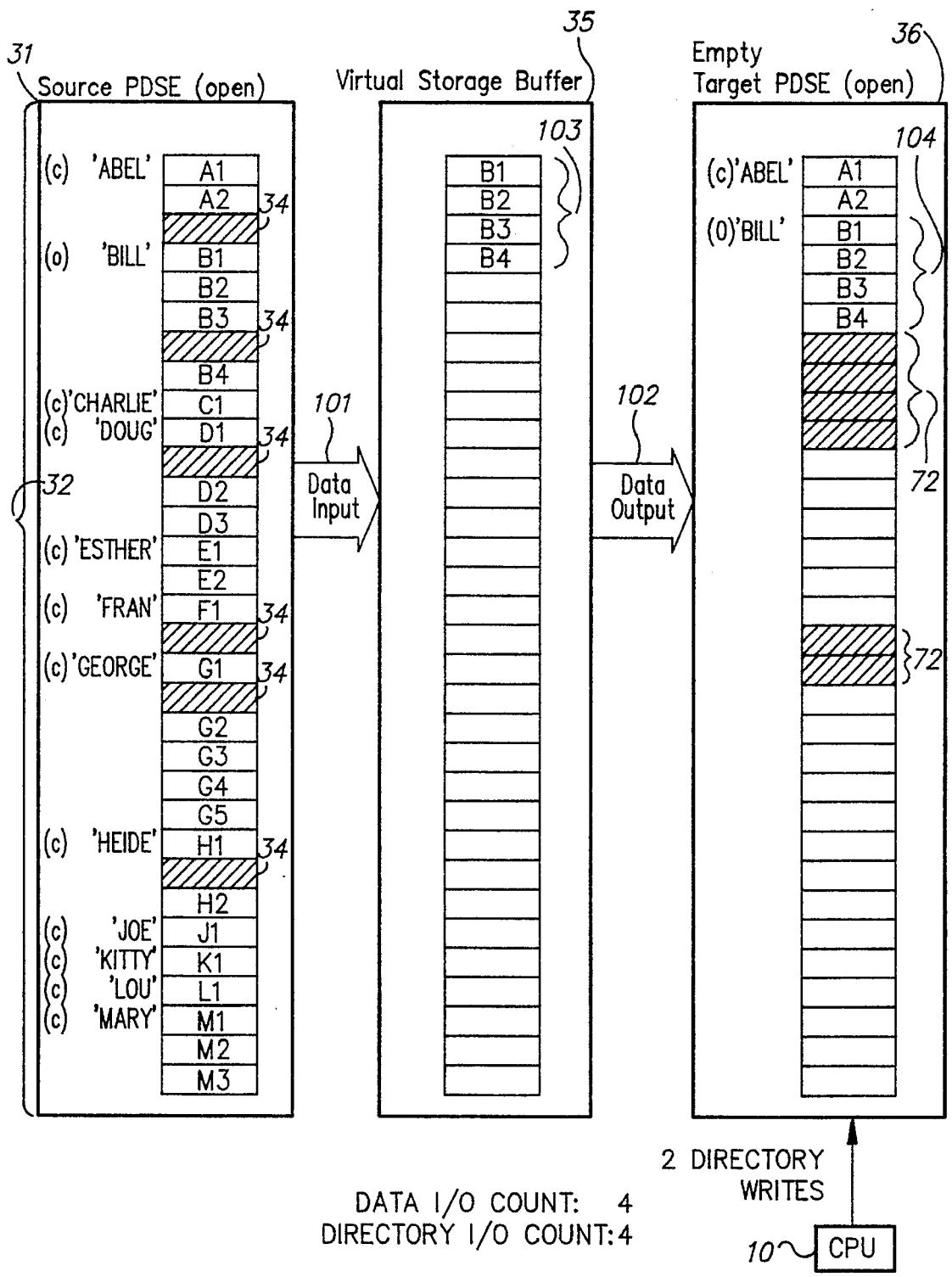
Figure 11:
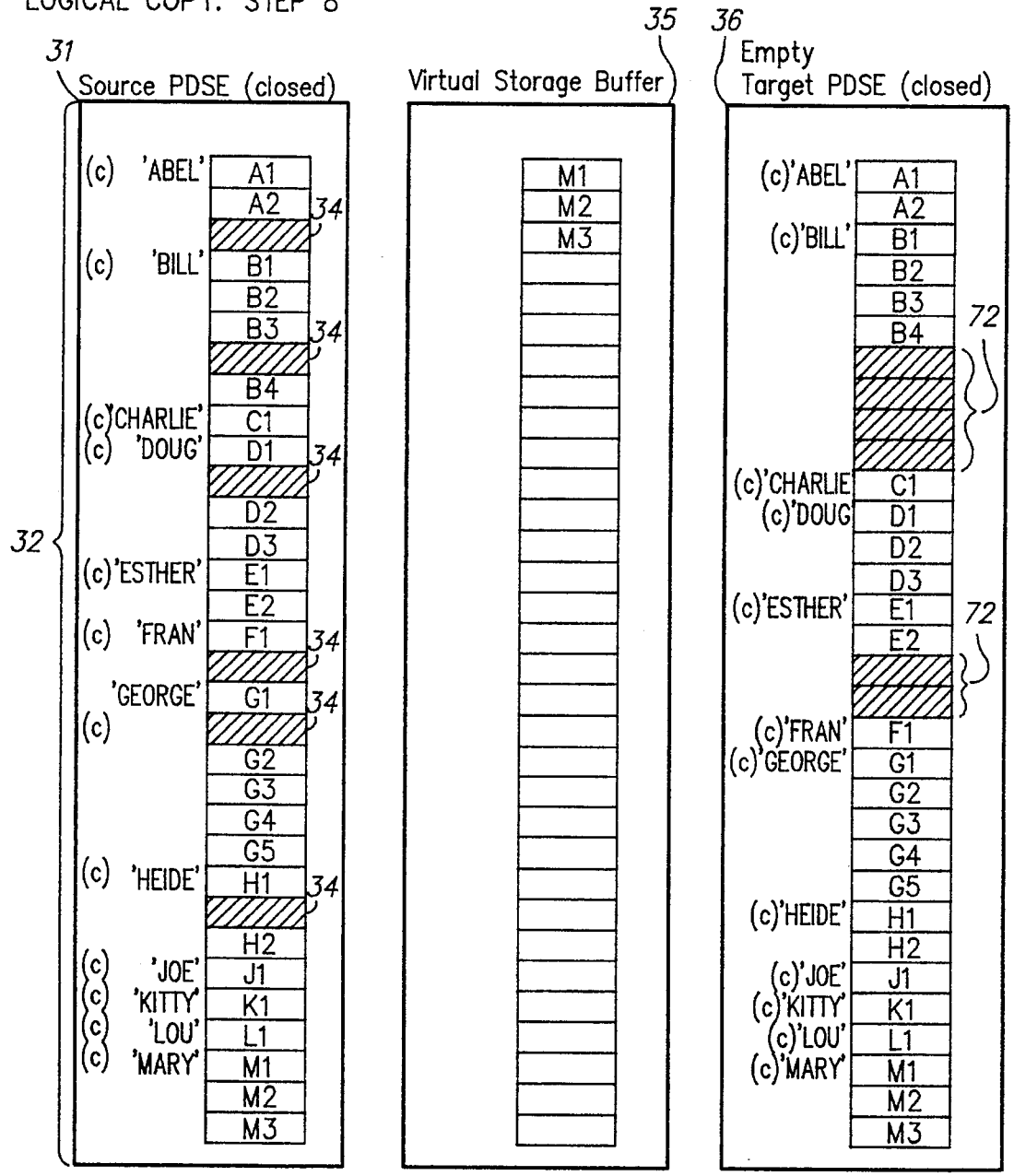

The sequence of Steps 62-67 is repeated until all members have been copied to the target device. FIG. 10 collectively illustrates the transfer of member "Bill" from source PDSE 31 to target PDSE 36. Note that the empty spaces or "gas" 34 between the source records is not copied to the buffer 35. When all members have been copied, the source and target datasets are closed (see FIG. 4, Step 69). FIG. 11 shows the final state of the closed PDSEs. During the repetition of Steps 2-7, a minimum of (m×2=24) data I/Os and (m×2=24) directory I/Os are required, where m is the number of dataset members selected to be copied.

Logical copying utilities such as the one just described are useful for transferring data from a device of one type to a device of a different type. Furthermore, the target dataset need not be empty. In fact, it may already have existing members. Moreover, only those members of the source dataset currently being copied are locked from other users. But it is readily apparent from FIGS. 6-11 that a large number of I/Os are required to copy a dataset with many members. In the method shown, at least 4 I/Os are required to copy each member. This I/O overhead, as well as the remapping which occurs during transfer, substantially increases the amount of time required to copy a dataset when compared with physical copy operations.

Figure 12:
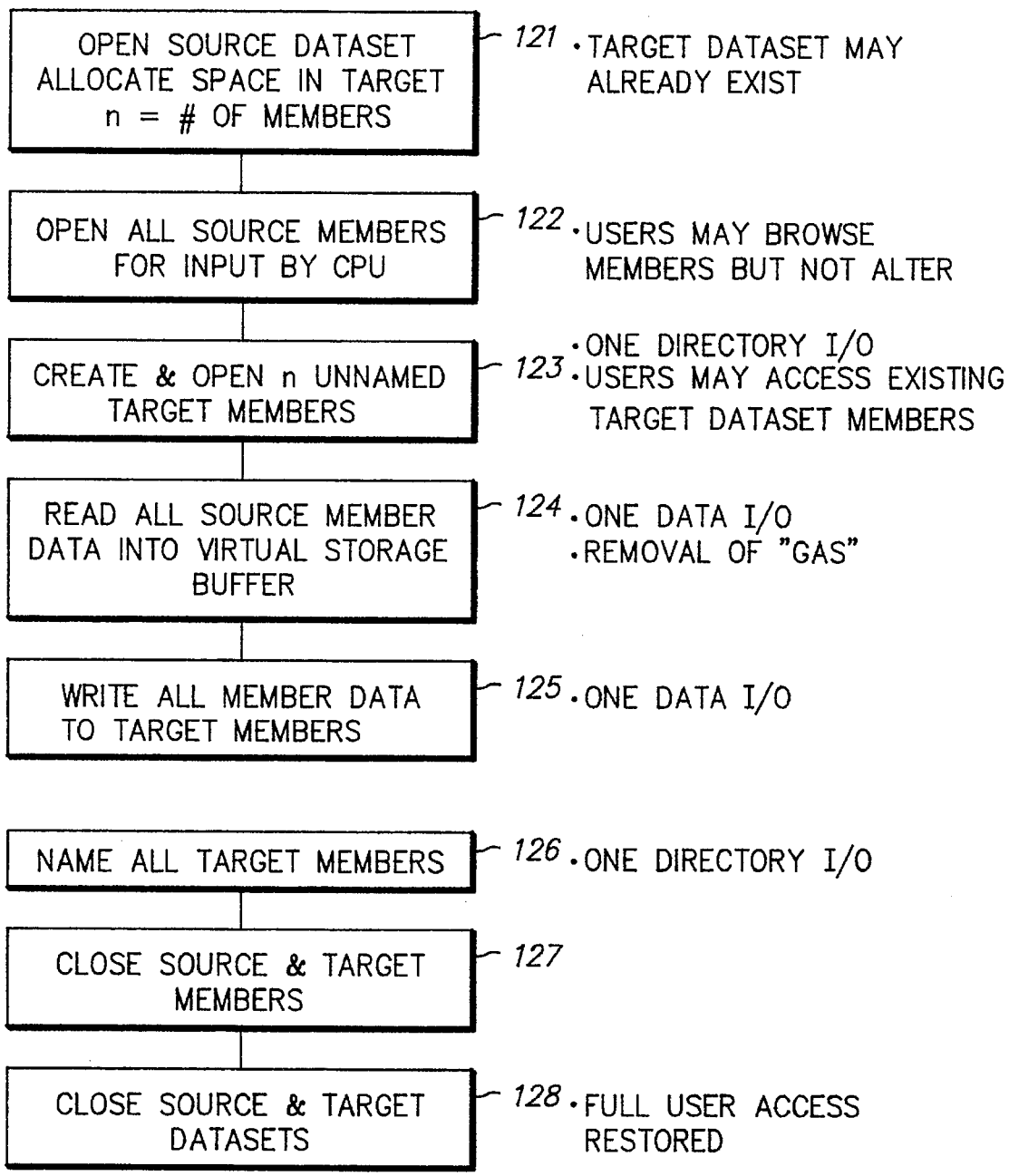
FIG. 12 is a high-level flow diagram of the present invention.

The present invention is illustrated in its simplest form in FIG. 12. The contents of a source dataset 31, target dataset 36 and virtual storage buffer 35 during the copy operation are shown by way of example in FIGS. 13-16. In Step 121 of FIG. 12, a source partitioned dataset is opened on DEV1 16. The number of members selected for copying and their total record length is determined in order to allocate sufficient space on the target device. Space is allocated in either an existing dataset or a newly created dataset. If the target dataset has existing members, these will remain accessible and alterable to users for the duration of the copy operation.

Figure 13:
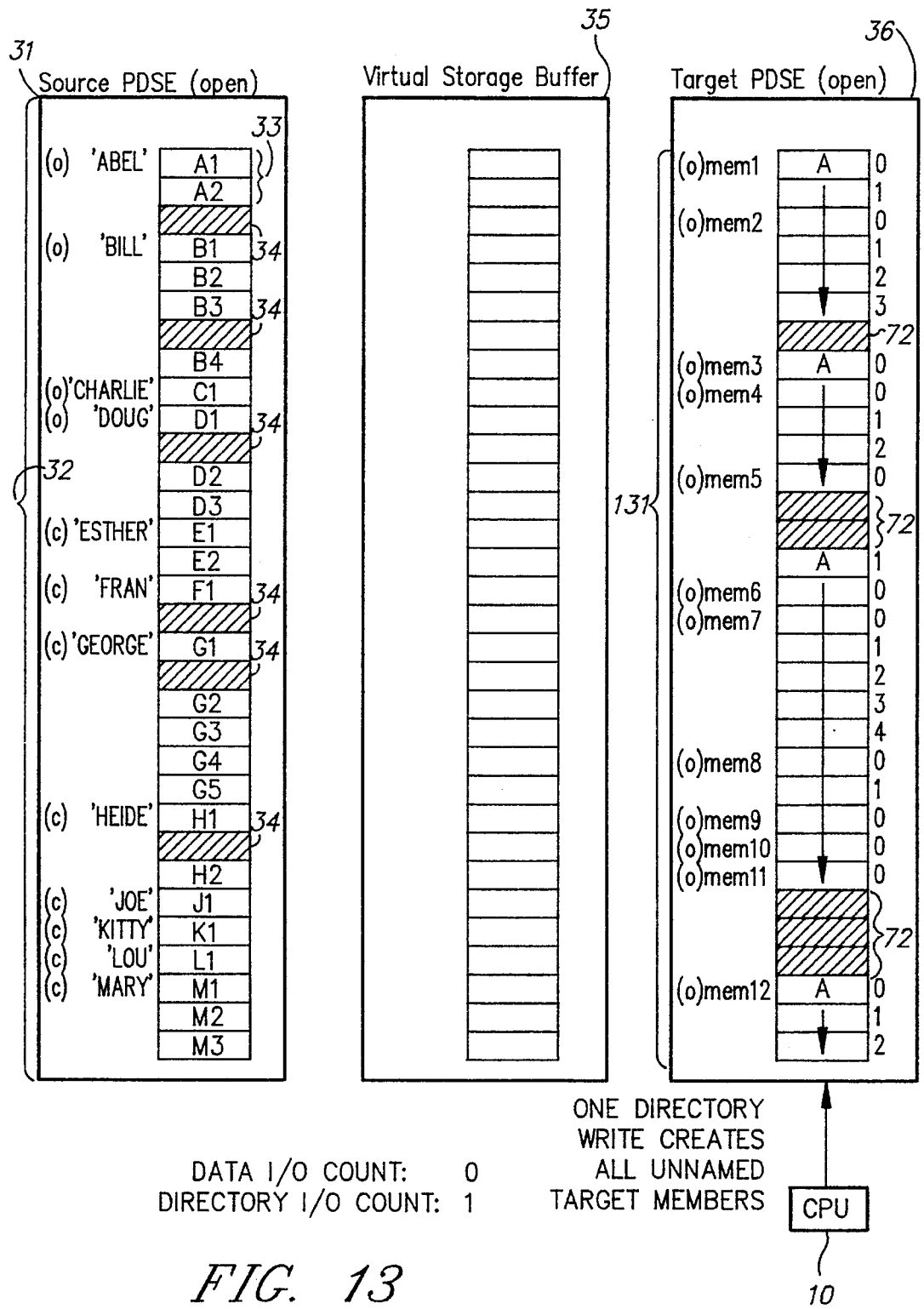
FIGS. 13, 14, 15 and 16 illustrate the contents of a source dataset, target dataset and virtual storage during the copy operation of the present invention shown in FIG. 12.

In Step 122, all members of the source dataset which have been selected for copying are opened for input. These will remain accessible to other users for browsing, but not for alteration. In Step 123, the CPU issues a directory write to create a number of unnamed members in the target dataset. The number of members created is equal in number and length to the source dataset members 32 selected for copying. These target members are opened for output 33 but will be invisible to system users. FIG. 13 illustrates Steps 121–123. The source and target datasets 31,36 are in an open state. The shaded areas 34 in the source PDSE 31 represent empty space between member records. The shaded areas 72 in the target PDSE 36 represent unavailable space for writing (e.g. other dataset members or faulty data fields). Flowlines labeled "A" indicate space allocated for the target PDSE. An "(o)" beside each source member indicates that it has been selected and opened for input. The CPU 10 is shown issuing a directory write operation, and members created 131 as a result of this write are designated by dummy member names ("mem1"–"mem12") for illustration purposes. Note that the number of records allocated to each new member is equal to the number of records of each corresponding source member. An "(o)" beside each new target member indicates that it has been opened for output. The I/O counts at the bottom of FIG. 13 convey that only one directory write has been made at this point.

Figure 14:
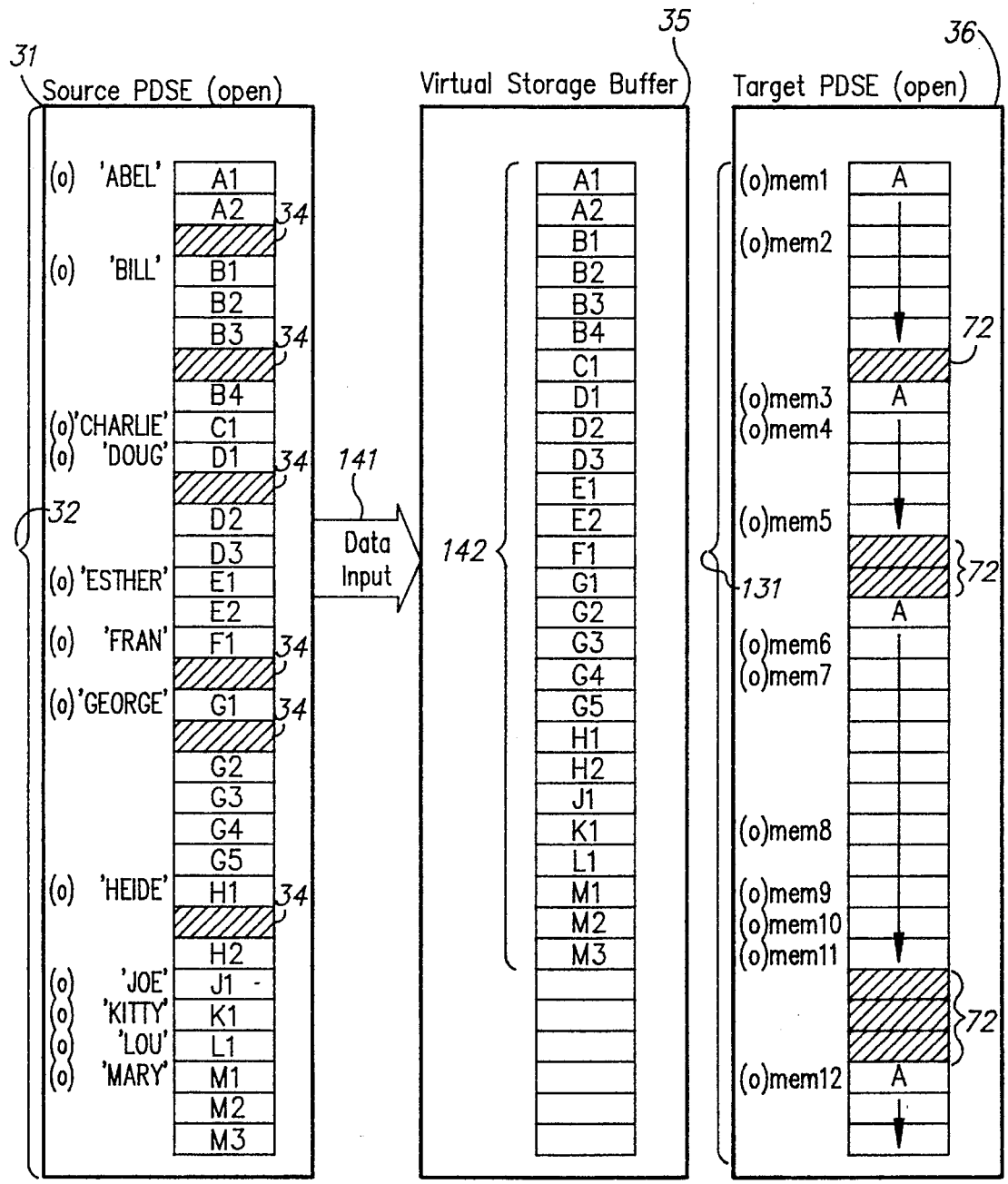

In Step 124, all of the source member data is read into the virtual storage buffer 35 in a single I/O operation. (See FIG. 12). This transfer is represented in FIG. 14 by an arrow 141 labeled "Data Input" from the source PDSE 31 to virtual storage buffer 35, and by the appearance of data records 142 in virtual memory. Note that the empty records between source members 32 have not been transferred to virtual storage, unlike the physical copy data transfer depicted in FIG. 124. The I/O count at page bottom indicates that only one data I/O has occurred.

Figure 15:
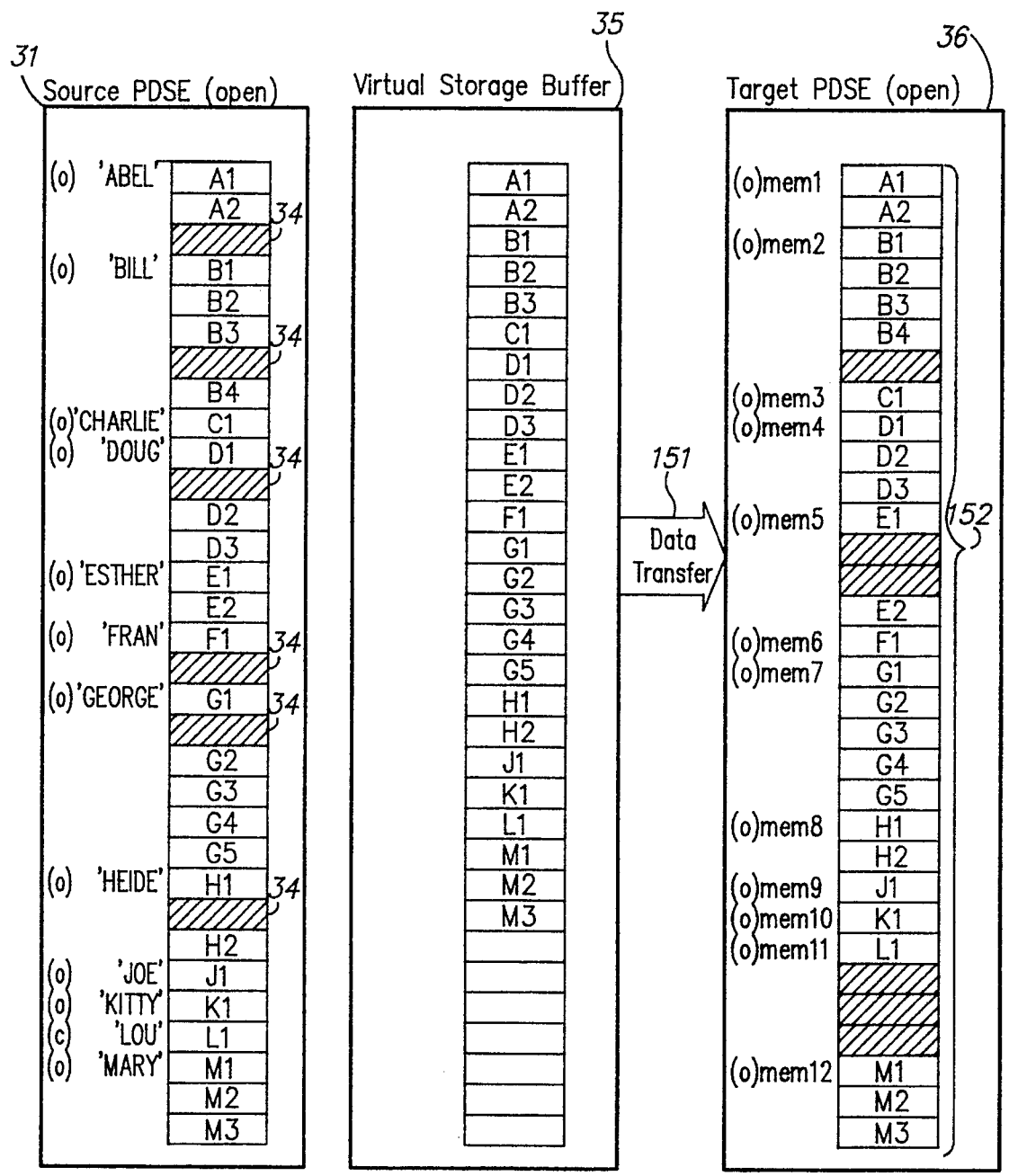

The data records 142 in virtual storage 35 are next written to the target members in Step 125 in a single data I/O. (See FIG. 12). The data transfer of step 125 is represented in FIG. 15 by an arrow 151 labeled "Data Output" from virtual storage buffer 35 to target dataset 36, and by the appearance of data 152 in the allocated target space. The data I/O count now indicates that two data I/O's have transpired. If the virtual storage buffer 35 is not large enough to hold all of the source member records in Step 124, two (or more) reads and writes may be necessary to achieve the complete transfer. This situation is further addressed below in an implementation for limited virtual storage. Prior to the transfer of Step 125, data manipulations may be performed on the data in virtual storage by providing an exit to the utility program at this point. This feature was not implemented in the released version of the present invention, but would be an obvious variation to those skilled in the art.

Figure 16:
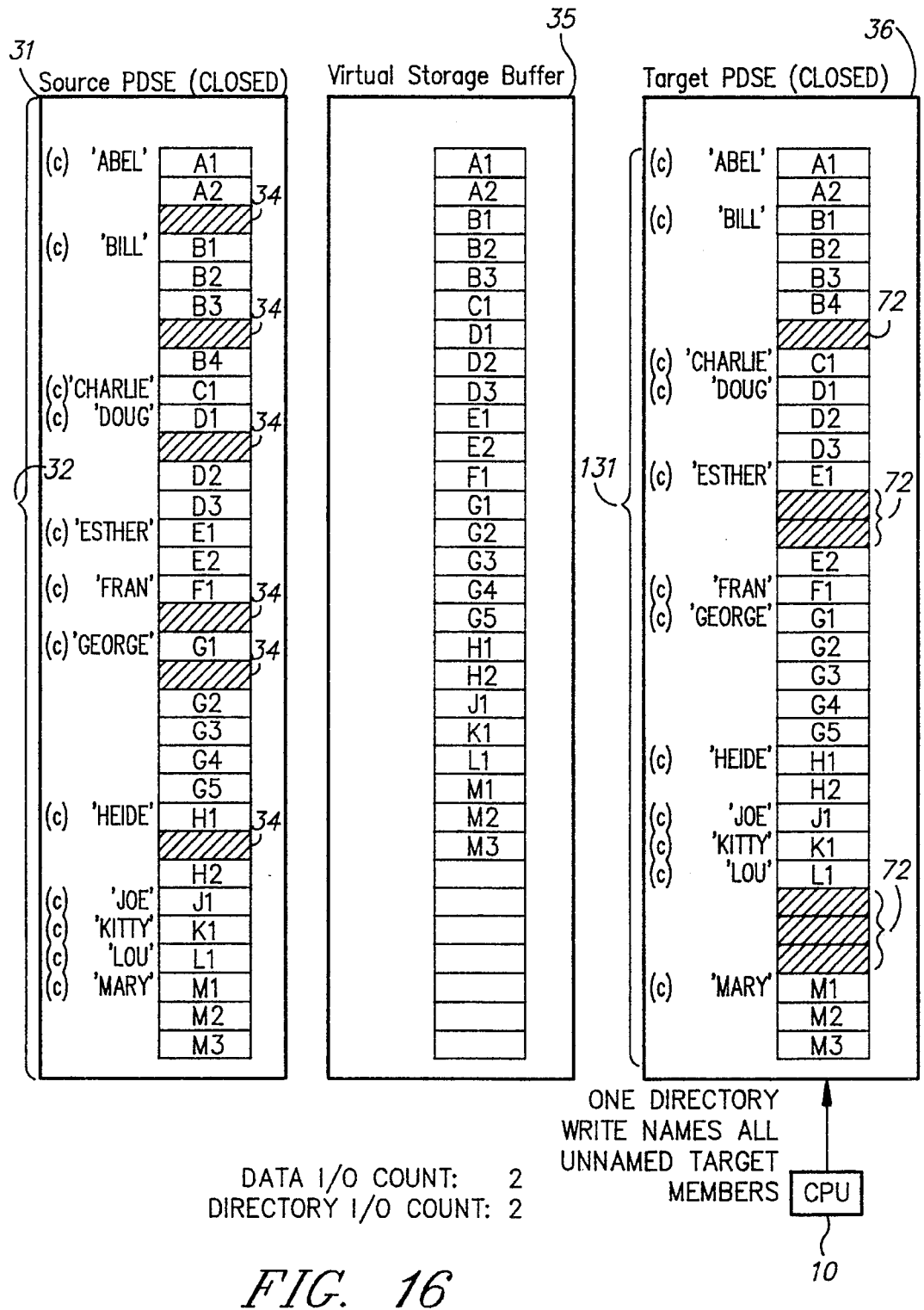

Once the source data has been written to the target device, all target members are named in Step 126 identically to their corresponding source member names. (See FIG. 12). The naming occurs in a single directory write operation. The source and target members are then closed in Step 127, and in Step 128 the source and target datasets are closed. Upon completion of Step 128, source and target members become accessible to other users for alteration. FIG. 16 shows the source and target datasets 31,36 upon completion of Steps 126–128. Note that the dummy target member names have been replaced by the real member names. The CPU 10 is included to illustrate that a directory write was issued to name the target members, and the directory I/O count reflects the additional I/O. The "(c)" designations beside the source members 32 and target members 131 indicate that these members have been closed.

Figure 17:
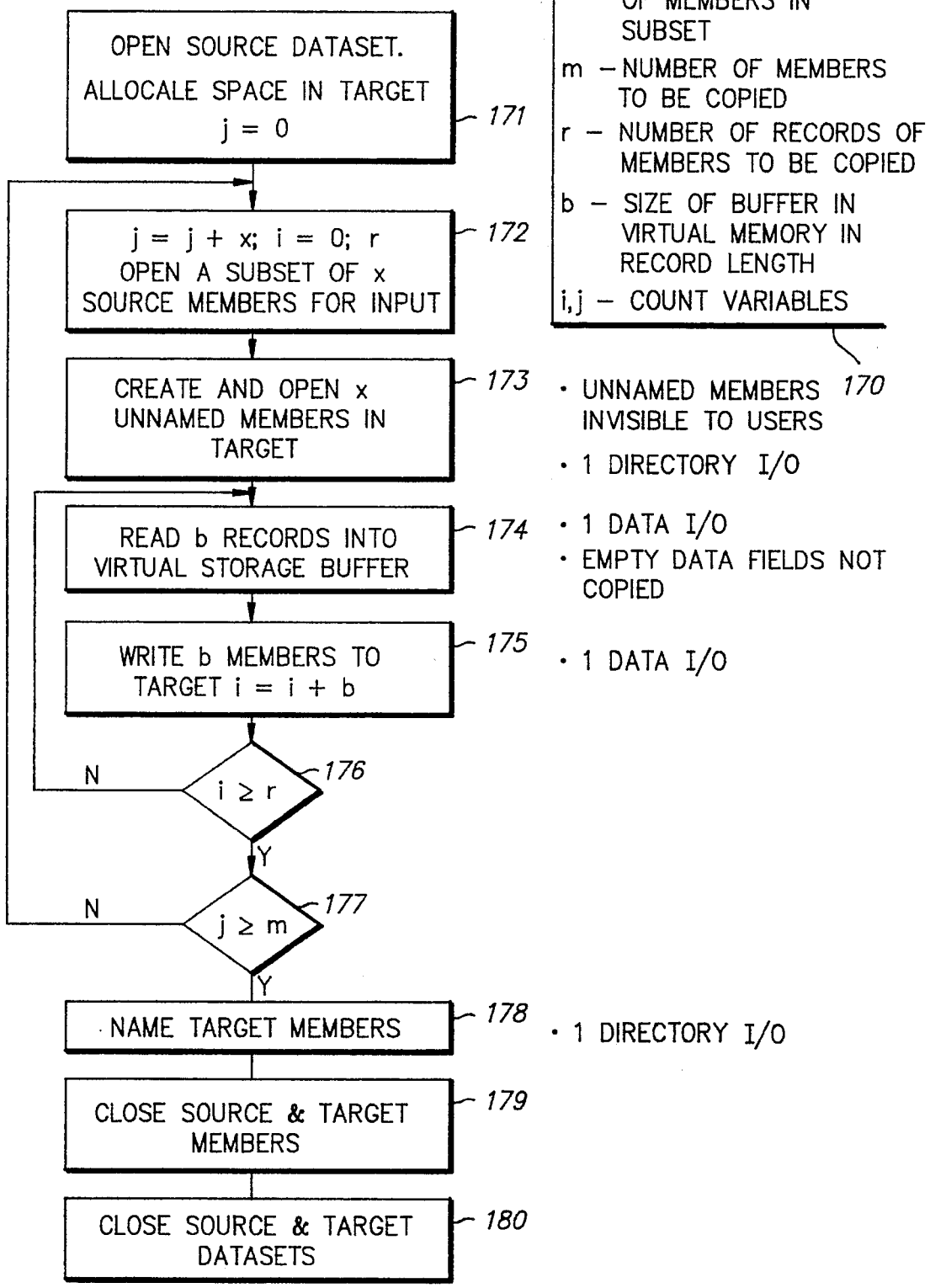
FIG. 17 is a high-level flow diagram of an alternative embodiment of the present invention directed to economizing virtual storage.

In MVS-based systems with limited availability of virtual storage, the present invention may be modified to operate on subsets of selected members rather than all selected members at once, using a smaller virtual buffer. One such implementation is shown in flow-diagram form in FIG. 17. A number of variables 170 are used to describe the sequence of events to take place. "M" represents the number of source members to be copied. Integer "X" is a predetermined number of members in a subset to copy in each pass of the copy operation, and variable "r" represents the total number of member records in the current subset. "B" is the size, in record length, of the virtual storage buffer. The "j" variable is initialized to zero and is used to count the number of members copied. The "i" variable is for counting the number of records of the member subset written to the target PDSE, and is reinitialized to zero whenever a new member subset is opened. The contents of the source PDSE, target PDSE and virtual memory during the modified copy operation are illustrated by way of example in FIGS. 18–24.

In Step 171, a source dataset is opened on a source device and a target dataset is created or designated on a target device. Space is allocated on the target sufficient to contain the source data. The count variables "i" and "j" are initialized to zero. A subset of X source members is opened for input in Step 172 (See FIG. 17). This number is added to count variable j to record the number of members operated on. In Step 173, X unnamed members are created in the target dataset.

Figure 18:
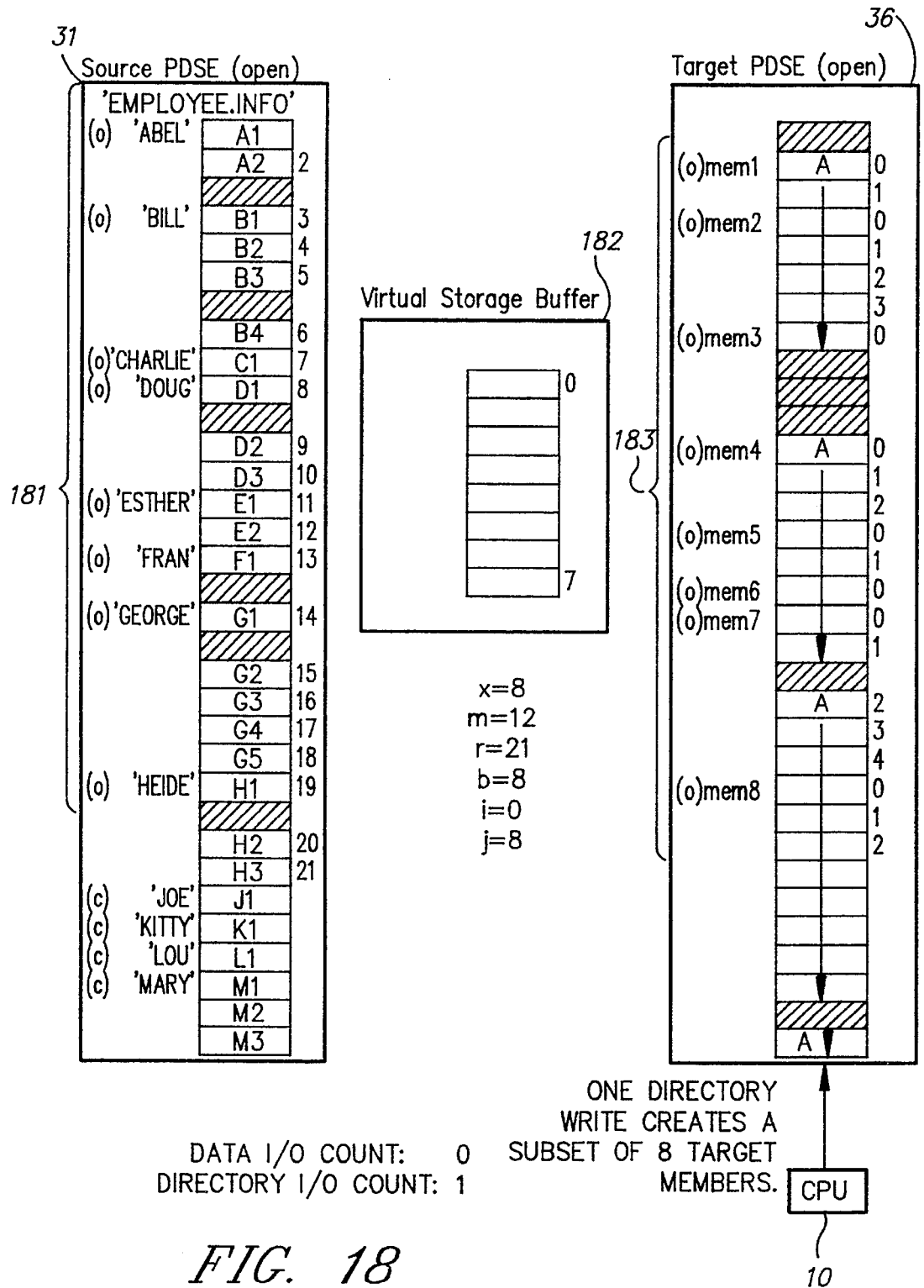
FIGS. 18, 19, 20, 21, 22, 23 and 24 illustrate the contents of a source dataset, target dataset and virtual storage during the copy operation of the alternative embodiment shown in FIG. 17.

FIG. 18 illustrates Steps 171–173 and shows a source PDSE 31, virtual storage buffer 182, and target PDSE 36. Twelve source members have been selected for copying, and the variable "M" has accordingly been assigned the value of 12. The virtual storage buffer 182 in this example has a record length ("B") of eight, and X (the number of members in a subset) has arbitrarily been assigned a value of eight. Space is allocated in the target PDSE as indicated by the flowlines labeled "A". For the first pass, eight source members 181 are opened for input, as shown by the "(o)" designation beside each source member. The remaining four members are labeled with a "(c)", indicating that they remain closed at this point. Since there are a total of twenty-one records in the member subset 181, the variable "r" is assigned the value of 21. Eight unnamed target members 383 are created in Step 173 by a CPU 10 initiated directory write. These are labeled with dummy names (mem1–mem8) for illustration purposes. Existing members in the target dataset will remain accessible to users for alteration, but newly created target members will be invisible until named in Step 176.

Figure 19:
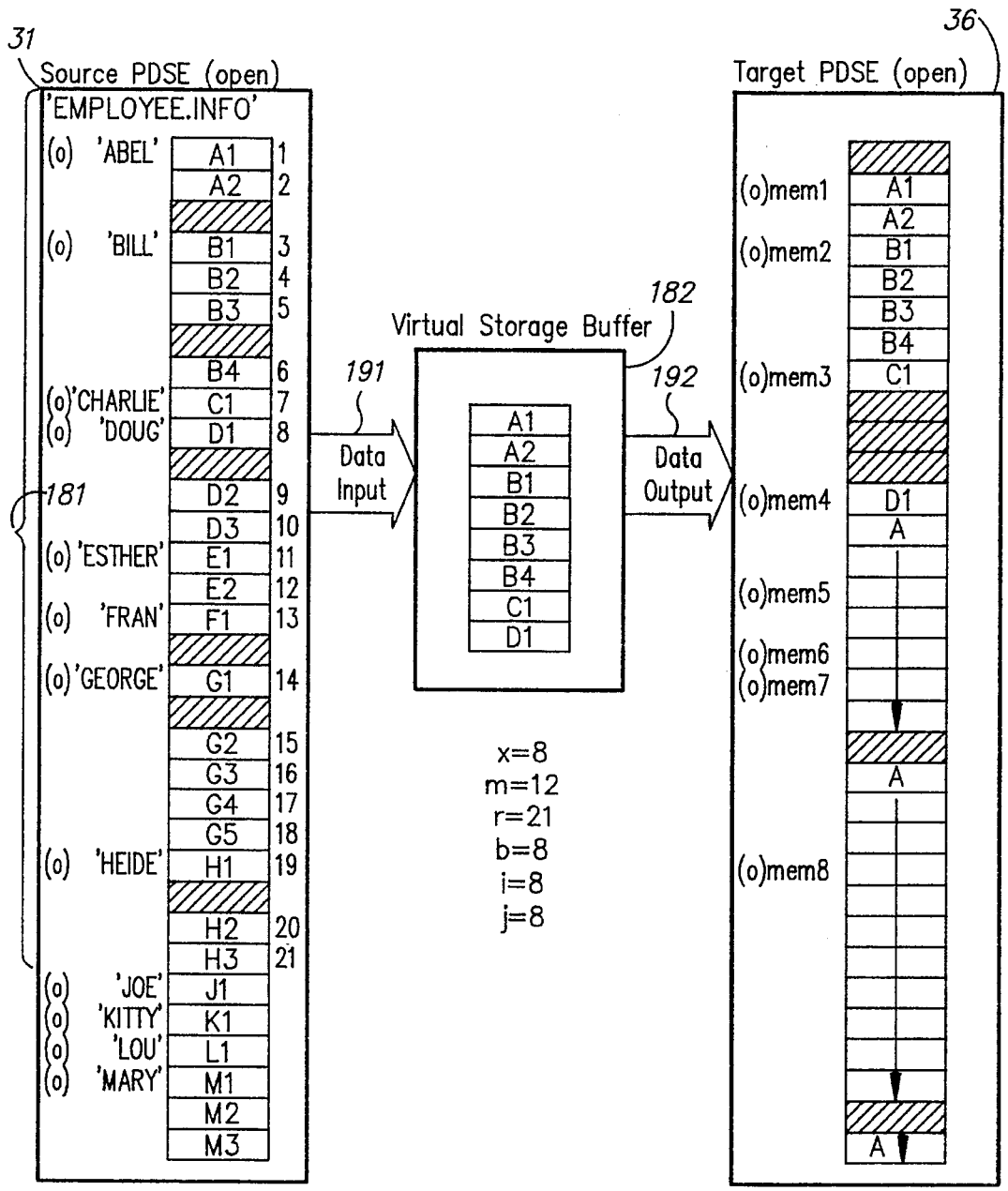
Figure 20:
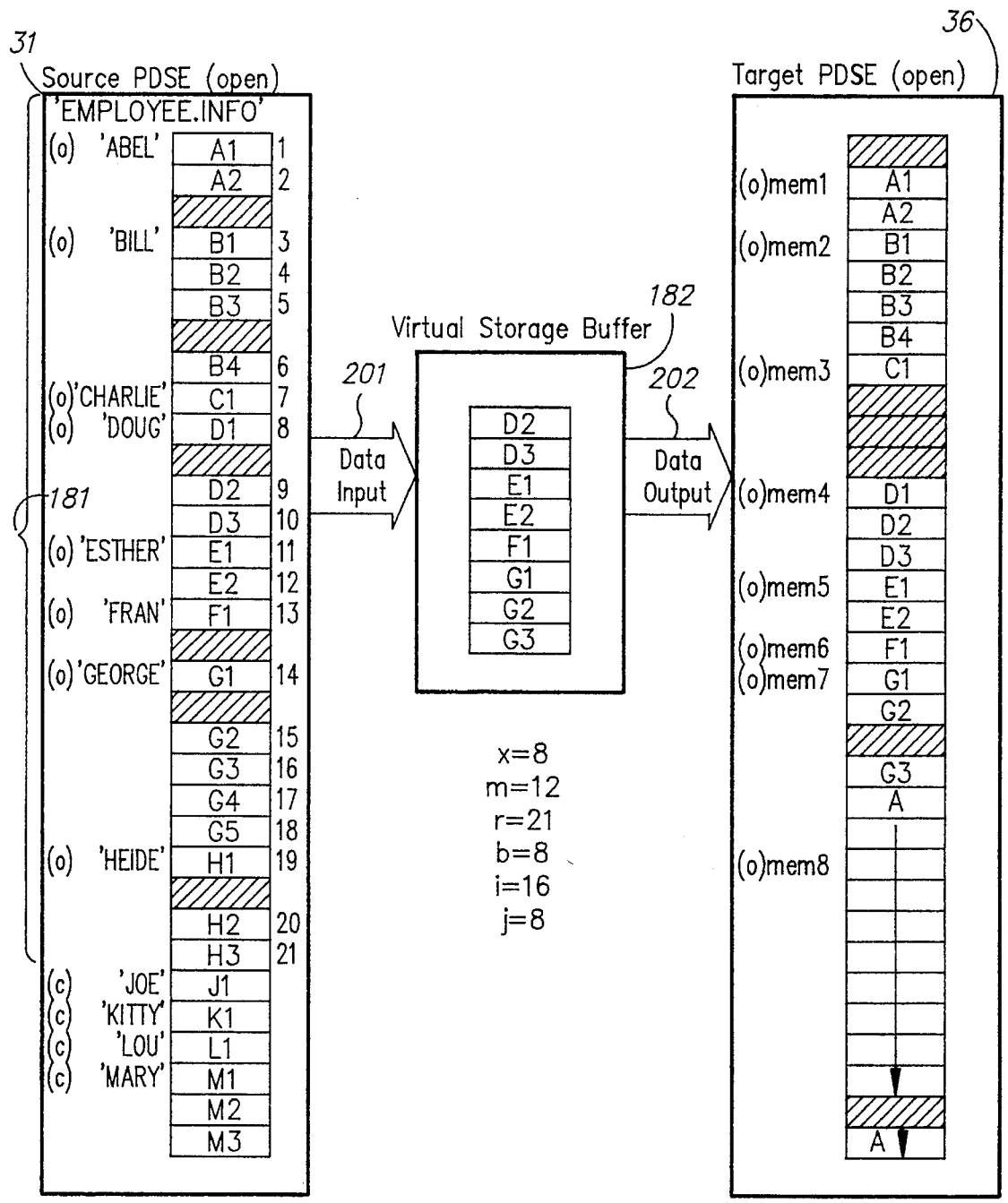
Figure 21:
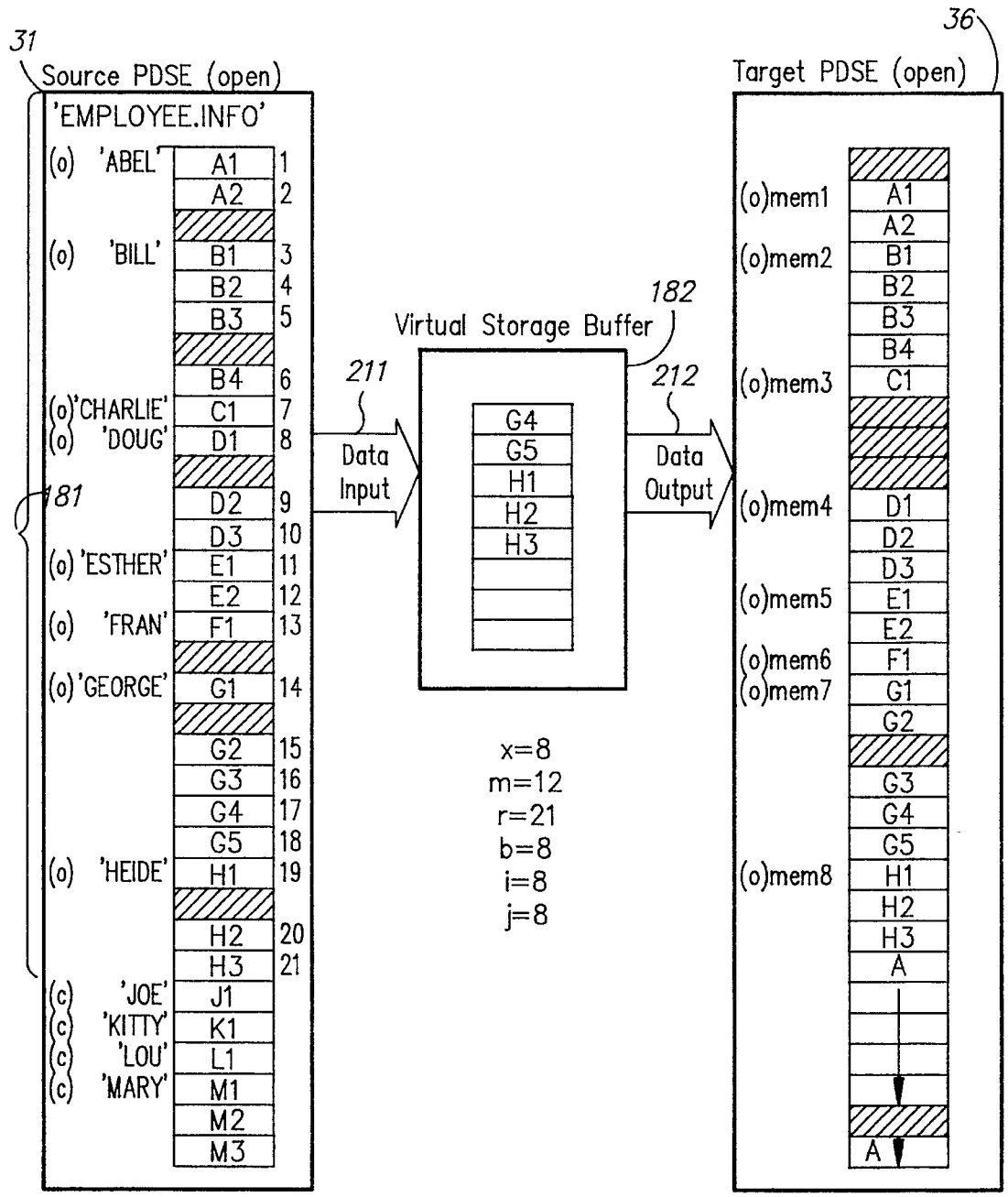

In a first read/write loop iteration, the first eight records of the source member subset are transferred to the virtual storage buffer 182 in Step 174 via a single data I/O. This transfer is represented in FIG. 19 by an arrow labeled "Data Input" from the source PDSE 31 to virtual storage buffer 182, and by the appearance of data in the buffer 182. In Step 175, the records are transferred from the buffer 182 to the appropriate unnamed target members. This transfer is represented by the arrow 192 labeled "Data Output" from virtual storage buffer 182 to the target PDSE. Note that the data I/O count has increased by two. Variable i is incremented by eight (the buffer size) in each read/write iteration to indicate the maximum number of subset member records copied. Steps 174 and 175 are repeated, as shown in FIGS. 20 and 21, until all records of the subset have been transferred to the target dataset, i.e. i≧r. Note the I/O counts in FIGS. 19–21.

Figure 22:
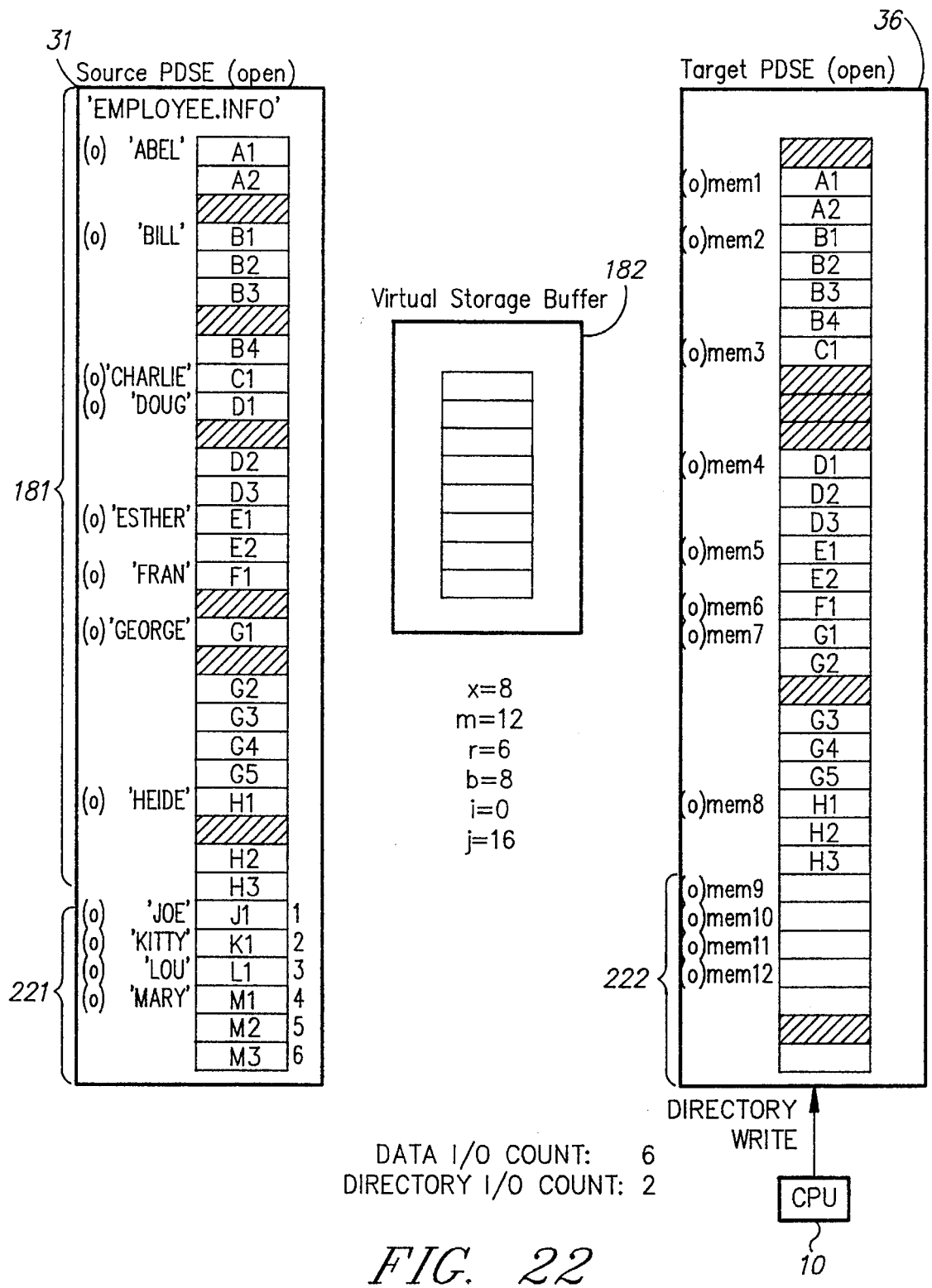

When copying of the first subset is complete, "j" is compared to the total number of selected members "M" to determine whether any members remain to be copied. (Refer to the second decision box 177 in FIG. 17). If members are remaining, a second pass through Steps 172–175 will be scheduled. Otherwise, copying of the data is complete and control continues on to Step 178. In the present example, a comparison of "j" (j=8) and "M" (M=12) reveals that four members remain to be copied, and another pass is scheduled. Referring to FIG. 22, the four remaining members 221 are opened for output in Step 2, as indicated by the "(o)" designation beside each member. Variable "j" (j=8) is incremented by "X" (X=8), recording another pass, and variable "i" is reinitialized to zero. Since there are a six records in the member subset, "r" is assigned the value of six.

Figure 23:
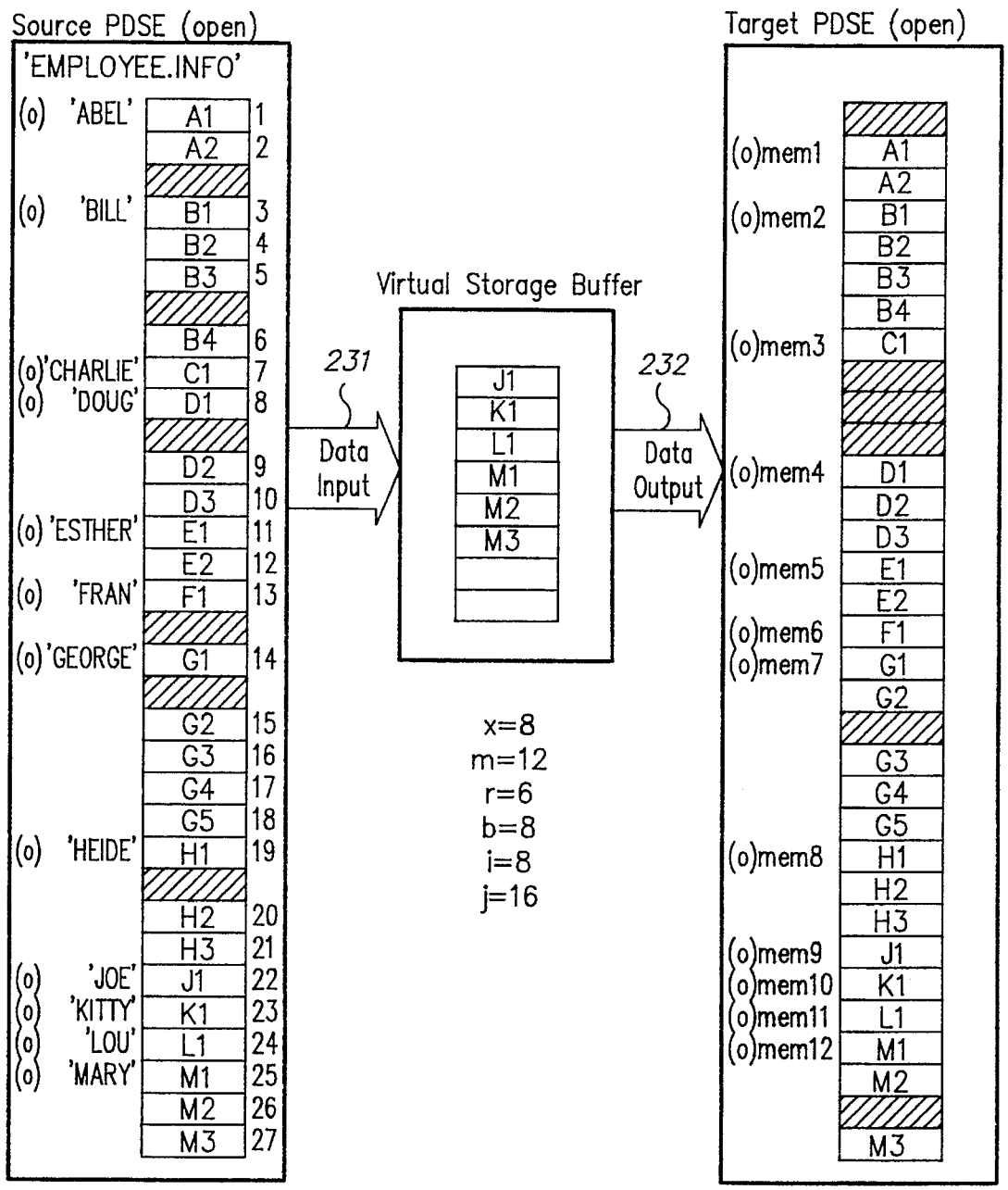

In Step 173, a CPU 10 initiated directory write creates four new unnamed target members 222. Not that the directory I/O count in FIG. 22 has been incremented by one. The new target members 222 are opened for output, as indicated by label "(o)" beside each member, and are given dummy names (mem9–mem12) for illustration purposes. These target members will be invisible to users until they have been named in Step 178. Data transfer occurs in Steps 174–175 in the manner previously described, and is shown in FIG. 23. Note that only one read/write iteration is required in the example, increasing the data I/O count by two.

Figure 24:
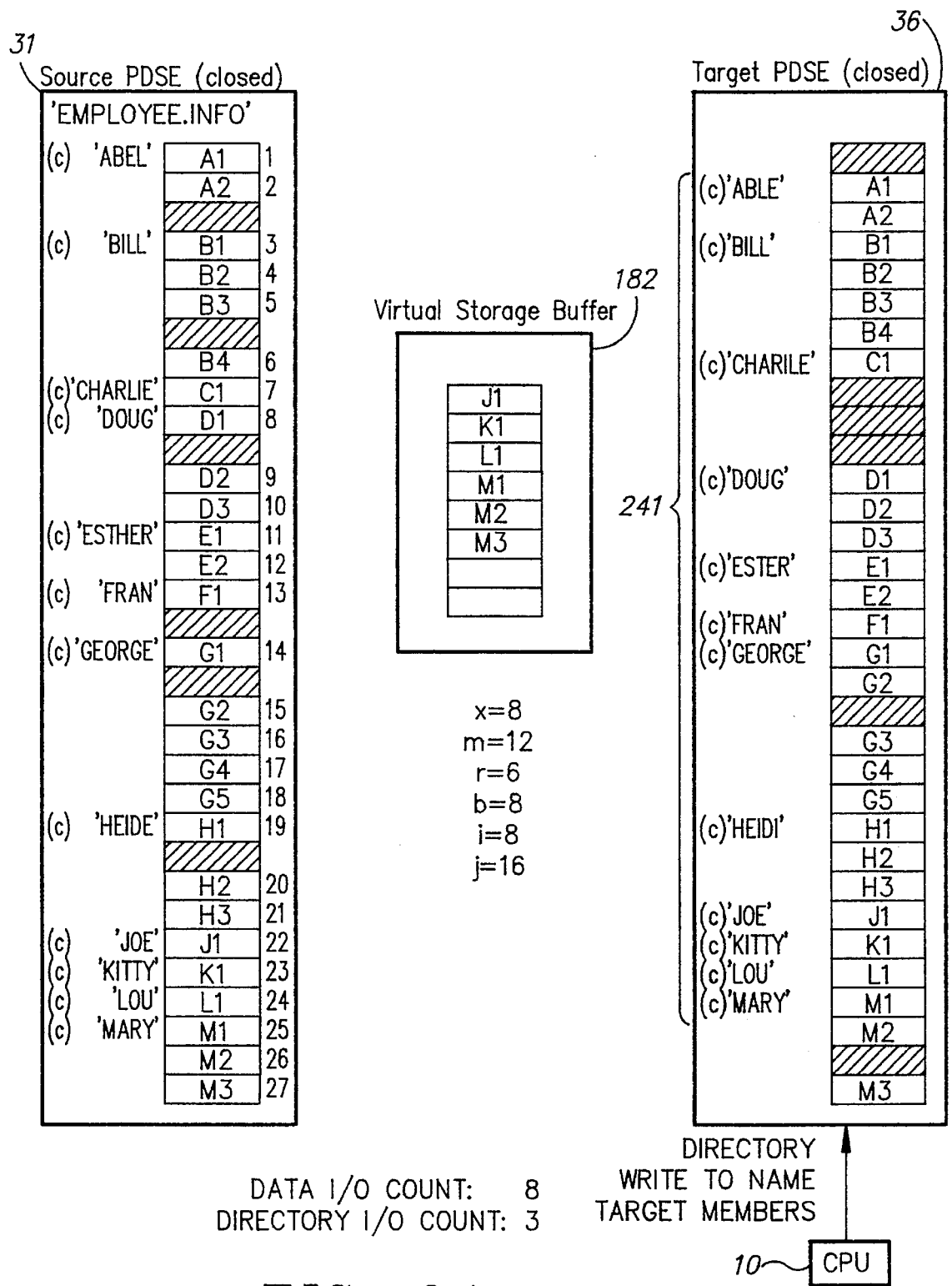

When all source members have been opened and all source records have been transferred, program control continues to Step 178. (Refer to FIG. 17) In Step 178, all target members are named economically in a single directory write initiated by the CPU. Then all source and target members are closed in Step 179, and the source and target datasets are closed in Step 180. Access to the source and target datasets is completely restored to other users upon completion of these final steps. Returning to the present example, a comparison of "j" (j=16) and "M" (M=12) at this stage indicates that a third pass through Steps 172–175 is not required. Control now advances to Step 178, and all target members are named according to their respective source members. FIG. 24 illustrates the states of the source PDSE 31, target PDSE 36 and virtual memory buffer 182 after execution of Steps 178–180. The dummy names beside the target members have been replaced with real names in a directory write represented by an arrow from the CPU 70. Note that the directory I/O count has been incremented. The "(c)" designation beside each source and target member indicates its closed state.

To appreciate the I/O savings of the present invention over conventional logical copy utilities, it is instructional to compare the I/O totals of FIG. 11 with those shown in FIGS. 16 and 24. One may readily perceive that a substantial degree of I/O overhead is eliminated by the method disclosed.

The embodiment just described has been implemented for an MVS operating system, and a pseudo code listing disclosing the program structure is listed below.

```
/****************************************************************/
/*      Pseudo code for Copy Performance algorithm              */
/****************************************************************/

Open Source PDSE for Input

Open Target PDSE for Output

If user provided list of members then build member list from user provided list else begin read Source PDSE directory build member list from output of reading directory end MEMBER_LIST = array of members /* Each element in MEMBER_LIST contains:                        */
/*      - Name of member from source                            */
/*      - space for Open token for member in source PDSE        */
/*      - space for Open token for member in target PDSE        */
/*      - pointer to file status record for source member       */

TOT_MEM_COUNT = total number of members in member list
```

```
/* Open Source members for input: */

Read file status record for each member in MEMBER_LIST

Get shared member lock for each member (allows read but not write)

Place Open token and pointer to file status record into MEMBER_LIST for each member /* Create unnamed members:      */

Allocate file serial numbers for each new member in target PDSE

Insert new file status records for each new member into virtual storage version of target PDSE index Preallocate space for each new member using filesize from file status record pointed to by MEMBER_LIST entry If there is not enough space in target PDSE then Begin Issue Out of Space message Terminate operation End Open the unnamed members and place the open tokens in MEMBER_LIST Write index to target PDSE in single atomic operation /* Copy the Member data by reading the source members and writing to */
/* the pre-allocated target members:                                 */

Allocate I/O buffer

BUFSIZE = number of blocks in I/O buffer

CURR_MEM = 1

CURR_BLOCK = 1
```

While CURR_MEM <= TOT_MEM_COUNT

/* Prepare read and write I/O parameter lists, READ_ADDR(I) is   */
/* the physical disk address of a block from a input member to   */
/* be read into the Ith block of the I/O buffer. WRITE_ADDR(I)   */
/* is the physical disk address that the Ith block in the I/O    */
/* buffer should be written to in the target PDSE.               */
/* SOURCE_DISK_ADDR is a function that provides the physical     */
/* disk address for the requested block from the specified       */
/* member, in the source PDSE. TARGET_DISK_ADDR is the           */
/* corresponding function for the target PDSE.                   */

```
Begin

For I = 1 to BUFSIZE

Begin

READ_ADDR(I)  = SOURCE_DISK_ADDR( MEMBER_LIST(CURR_MEM),

CURR_BLOCK)

WRITE_ADDR(I) = TARGET_DISK_ADDR( MEMBER_LIST(CURR_MEM),

CURR_BLOCK)

CURR_BLOCK = CURR_BLOCK + 1

If CURR_BLOCK > File size of CURR_MEM then begin

CURR_MEM = CURR_MEM + 1

CURR_BLOCK = 1 end

If CURR_MEM > TOT_MEM_COUNT then leave For loop

End /* For I = 1 to BUFSIZE */

Issue Read I/O

Wait for I/O to complete

Issue Write I/O

Wait for I/O to complete

End /* While CURR_MEM <= TOT_MEM_COUNT  */
```

```
/* Name members in target PDSE */

Insert names from MEMBER_LIST into virtual storage version of target PDSE name index Write name index to target PDSE in single atomic operation Close source members Close target members Close source PDSE Close target PDSE

/*************************** END *****************************/
```

The present invention has been described with reference to an MVS operating system. However, its general concept may also be applied in other operating systems with system managed storage, such as DOS or UNIX environments. In these latter systems, data is hierarchically organized into a tree structure having a root directory and subdirectories. Data in each directory is further organized into files. The directories are analogous to partitioned datasets in an MVS system, and their files may be compared to dataset members.

Much like the presently-known logical copy function on MVS, logical copying of directory files requires copying one file at a time from a source directory to a target directory. Thus the present invention provides an efficient method for copying all files of a source directory to a target directory by significantly reducing the number of I/O operations required compared to previous methods. Access to files being copied is preserved for browsing.

Figure 25:
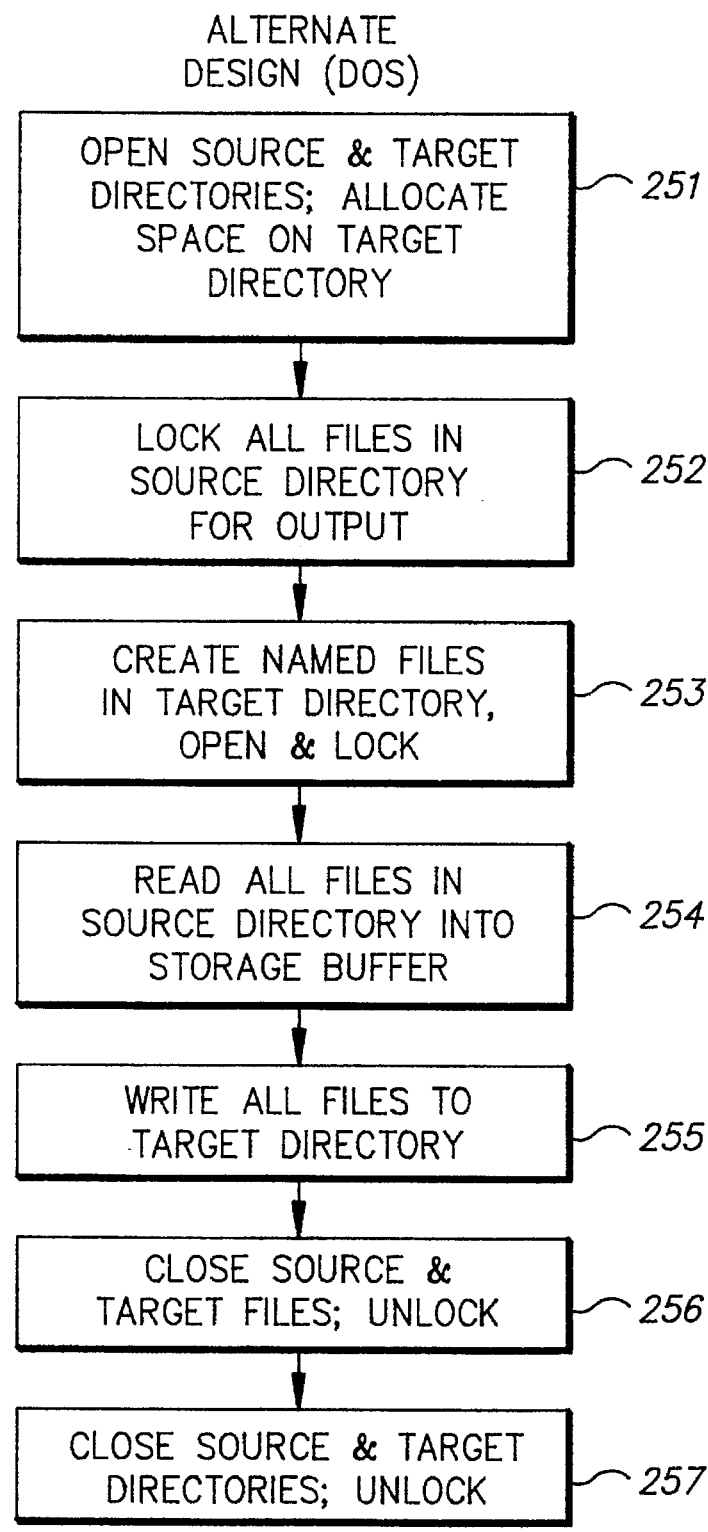
FIG. 25 is a high-level flow diagram of an alternative embodiment of the present invention for use in systems having an operating system with hierarchical directory structures.

One proposed embodiment for a DOS, UNIX or OS/2 environment is illustrated in FIG. 25. In Step 251, a source directory is opened, and space is allocated on a target device for the files to be copied. An existing directory on the target device may be designated as the target directory, or a new directory may be created.

All files in the source directory are locked for input in Step 252. In other words, users are permitted to browse (but not alter) the files while they remain open. Next, a number of named files are created in the target directory equal to the number of source files in Step 253. These target files are opened for output and locked. If the target directory has existing files, these remain accessible to users for alteration. However, the newly created target files are not accessible until copying has been completed.

In Step 254, all files are read into a virtual storage via a single data I/O. These files are then written to the target files in a single data I/O. Prior to writing, exits may be provided in the program so that file data can be manipulated. Once all files have been copied, the source and target directories are closed and unlocked, restoring full access to end-users.

While the invention has been particularly described and illustrated with reference to a preferred embodiment, it will be understood by those skilled in the art that changes in the description or illustrations may be made with respect to form or detail without departing from the spirit and the scope of the invention.

We claim:

1. In a computer system comprising a CPU coupled to a storage subsystem, the CPU concurrently executing an operating system and at least one application program, the CPU and the storage subsystem being coupled to a common memory, the storage subsystem comprising a source storage device and a target storage device, a source partitioned data set being stored on the source storage device, the source data set having a plurality of source members each having only one source block, the source data set also having a source directory of source member names, the source partitioned data set at times having empty space (gas), a method for copying the plurality of source members from the source partitioned data set to the target partitioned data set which substantially reduces the number of I/Os required to copy the source partitioned data set in a logical copy operation, comprising the steps of:

selecting a first number greater than one of source members to copy from the source partitioned data set to a target partitioned data set;

ascertaining a target size of storage space required to store a copy of the first number of source members in the target partitioned data set as the target partitioned data set's members' blocks;

reserving, on the target storage device, in a single mass create directory I/O operation, a number of unnamed target members in a target directory for the target partitioned data set, equal to the first number;

reserving, on the target storage device, a storage space for the target partitioned data set equal to the ascertained target size;

copying, in a single copy operation having a single mass read I/O operation from the source partitioned data set and also having a single mass write I/O operation to the target partitioned data set, a group of source blocks from the plurality of source members of the source partitioned data set through the common memory to the target partitioned data set, the source blocks being copied without the empty space, wherein during the step of copying, the operating system and the at least one application program have read access to those of the source members being copied and update access to those of the source members not being copied; and writing, in a single directory mass name I/O operation, the source member names of the ascertained first number of source members into the corresponding unnamed target members in the target directory.

2. The method of claim 1 wherein the step of copying is repeated until all source blocks of the source partitioned data set are copied to the target partitioned data set.

3. The method of claim 1 wherein the common memory has a predetermined size.

4. The method of claim 1 wherein, during the step of copying, if the target partitioned data set has existing members prior to the start of the copy operation, the existing members remaining available to the operating system and the application programs for reading and writing.

5. In a computer system comprising a CPU coupled to a storage subsystem, the CPU concurrently executing an operating system and at least one application program, the CPU and the storage subsystem being coupled to a common memory, the storage subsystem comprising a source storage device and a target storage device, a source partitioned data set being stored on the source storage device, the source data set having a plurality of source members each having only one source block, the source data set also having a source directory of source member names, the source partitioned data set at times having empty space (gas), an apparatus for copying the plurality of source members from the source partitioned data set to the target partitioned data set which substantially reduces the number of I/Os required to copy the source partitioned data set in a logical copy operation, comprising:

a selection means for selecting a first number greater than one of source members to copy from the source partitioned data set to a target partitioned data set;

an ascertaining means for ascertaining a target size of storage space required to store a copy of the first number of source members in the target partitioned data set as the target partitioned data set's members' blocks;

a mass reservation means for reserving, on the target storage device, in a single mass create directory I/O operation, a number of unnamed target members in a target directory for the target partitioned data set, equal to the first number;

a space reservation means for reserving, on the target storage device, a storage space for the target partitioned data set equal to the ascertained target size;

a mass copy means for copying, in a single copy operation having a single mass read I/O operation from the source partitioned data set and also having a single mass write I/O operation to the target partitioned data set, a group of source blocks from the plurality of source members of the source partitioned data set through the common memory to the target partitioned data set, the source blocks being copied without the empty space, wherein the operating system and the at least one application program have read access to those of the source members being copied and update access to those of the source members not being copied; and a mass write means for writing, in a single directory mass name I/O operation, the source member names of the ascertained first number of source members into the corresponding unnamed target members in the target directory.

6. The apparatus of claim 5 wherein the mass copy means repeatedly copies source blocks until all source blocks of the source partitioned data set are copied to the target partitioned data set.

7. The apparatus of claim 5 wherein the common memory has a predetermined size.

8. The apparatus of claim 5 wherein when the mass copy means is copying, if the target partitioned data set has existing members prior to the start of the copy operation, the existing members remaining available to the operating system and the application programs for reading and writing.

9. An article of manufacture for use in a computer system comprising a CPU coupled to a storage subsystem, the CPU concurrently executing an operating system and at least one application program, the CPU and the storage subsystem being coupled to a common memory, the storage subsystem comprising a source storage device and a target storage device, a source partitioned data set being stored on the source storage device, the source data set having a plurality of source members each having only one source block, the source data set also having a source directory of source member names, the source partitioned data set at times having empty space (gas), the article of manufacture comprising a computer-readable storage medium having a computer program code, for copying the plurality of source members from the source partitioned data set to the target partitioned data set which substantially reduces the number of I/Os required to copy the source partitioned data set in a logical copy operation, embodied in said medium which may cause the computer to:

select a first number greater than one of source members to copy from the source partitioned data set to a target partitioned data set;

ascertain a target size of storage space required to store a copy of the first number of source members in the target partitioned data set as the target partitioned data set's members' blocks;

reserve, on the target storage device, in a single mass create directory I/O operation, a number of unnamed target members in a target directory for the target partitioned data set, equal to the first number;

reserve, on the target storage device, a storage space for the target partitioned data set equal to the ascertained target size;

copy, in a single copy operation having a single mass read I/O operation from the source partitioned data set and also having a single mass write I/O operation to the target partitioned data set, a group of source blocks from the plurality of source members of the source partitioned data set through the common memory to the target partitioned data set, the source blocks being copied without the empty space, wherein during the copy, the operating system and the at least one application program have read access to those of the source members being copied and update access to those of the source members not being copied; and write, in a single directory mass name I/O operation, the source member names of the ascertained first number of source members into the corresponding unnamed target members in the target directory.

10. The article of manufacture of claim 9 wherein the computer program code embodied in said medium further causes the computer to:

repeatedly copy source blocks until all source blocks of the source partitioned data set are copied to the target partitioned data set.

11. The article of manufacture of claim 9 wherein the common memory has a predetermined size.

12. The method of claim 9 wherein the computer program code embodied in said medium further causes the computer to:

if the target partitioned data set has existing members prior to the start of the copy, the existing members remain available to the operating system and the application programs for reading and writing.

* * * * *